United States Patent [19]

Hashiguchi et al.

[11] Patent Number: 4,933,857
[45] Date of Patent: Jun. 12, 1990

[54] TRACTION CONTROL APPARATUS FOR VEHICLE ENGINE

[75] Inventors: Masayuki Hashiguchi, Oobu; Kiichi Yamada, Nagoya; Susumu Nishikawa; Shuji Ikeda, both of Okazaki; Makoto Shimada, Kyoto, all of Japan; Takashi Dogahara, Farmington Hills, Mich.

[73] Assignee: Mitsubishi Jidosha Kogyo Kabushiki Kaisha, Tokyo, Japan

[21] Appl. No.: 175,860

[22] Filed: Mar. 31, 1988

[30] Foreign Application Priority Data

| Apr. 20, 1987 | [JP] | Japan | 62-96869 |
| Apr. 20, 1987 | [JP] | Japan | 62-96870 |
| Apr. 20, 1987 | [JP] | Japan | 62-96871 |
| Aug. 31, 1987 | [JP] | Japan | 62-216714 |
| Aug. 31, 1987 | [JP] | Japan | 62-216715 |
| Jan. 29, 1988 | [JP] | Japan | 63-19093 |

[51] Int. Cl.$^5$ ............... B60K 31/00; B60K 41/20
[52] U.S. Cl. ............... 364/426.02; 364/426.03; 364/426.04; 180/197; 303/100; 303/109
[58] Field of Search ............... 364/426.02–426.04; 180/197; 303/100, 102, 103, 105, 109

[56] References Cited

U.S. PATENT DOCUMENTS

| 4,136,303 | 1/1979 | Almquist et al. | 318/52 |
| 4,410,947 | 10/1983 | Strong et al. | 364/426.03 |
| 4,432,430 | 2/1984 | Lind et al. | 180/197 |
| 4,615,410 | 10/1986 | Hosaka | 364/426.03 |
| 4,682,667 | 7/1987 | Hosaka | 364/426.02 |
| 4,712,634 | 12/1987 | Lindemann | 180/197 |
| 4,763,912 | 8/1988 | Matsuda | 180/197 |
| 4,779,696 | 10/1988 | Harada et al. | 180/197 |
| 4,788,644 | 11/1988 | Inagaki | 180/197 |
| 4,790,404 | 12/1988 | Naito | 180/197 |
| 4,794,538 | 12/1988 | Cao et al. | 364/426.03 |

FOREIGN PATENT DOCUMENTS

| 0189165 | 1/1986 | European Pat. Off. |
| 2739567 | 9/1977 | Fed. Rep. of Germany |
| 59-238806 | 11/1984 | Japan |

Primary Examiner—Parshotam S. Lall
Assistant Examiner—Christopher L. Makay
Attorney, Agent, or Firm—Hedman, Gibson, Costigan & Hoare

[57] ABSTRACT

This invention has traction control means having slip detecting means for detecting slipping of driving wheels, in accordance with an output signal from the driving wheel velocity detecting means and an output signal from the vehicle body velocity detecting means, and output rate calculating means for generating first instruction A for controlling engine output, in order to immediately decrease a slip rate, based on a slip start signal from the slip detecting means and for, when the slip rate is decreased to a predetermined value, generating second instruction B for controlling the engine to provide an output according to friction coefficient $\mu$ between a road surface and wheels, and engine output control means for controlling engine output on the basis of the first and second instructions and vehicle operating conditions.

14 Claims, 21 Drawing Sheets

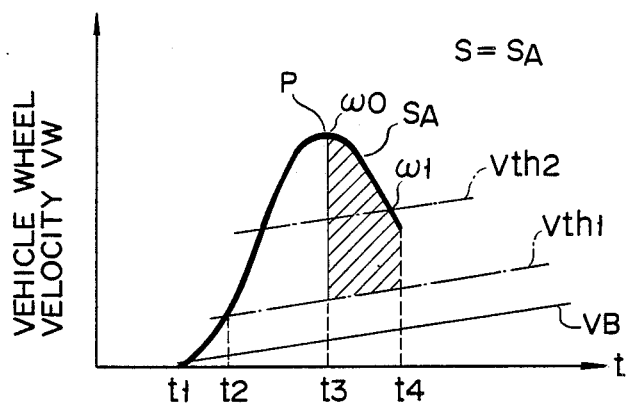
F I G. 3A
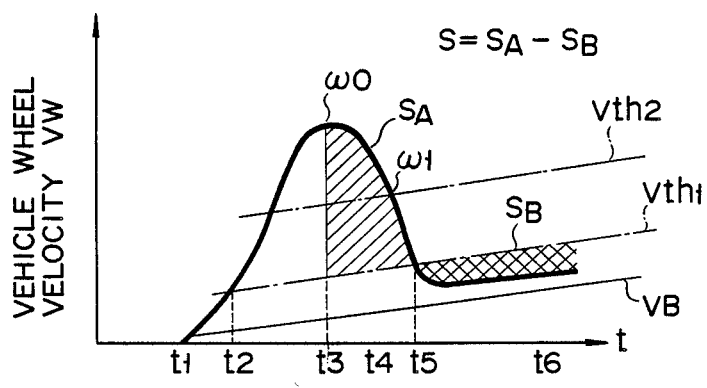
F I G. 3B

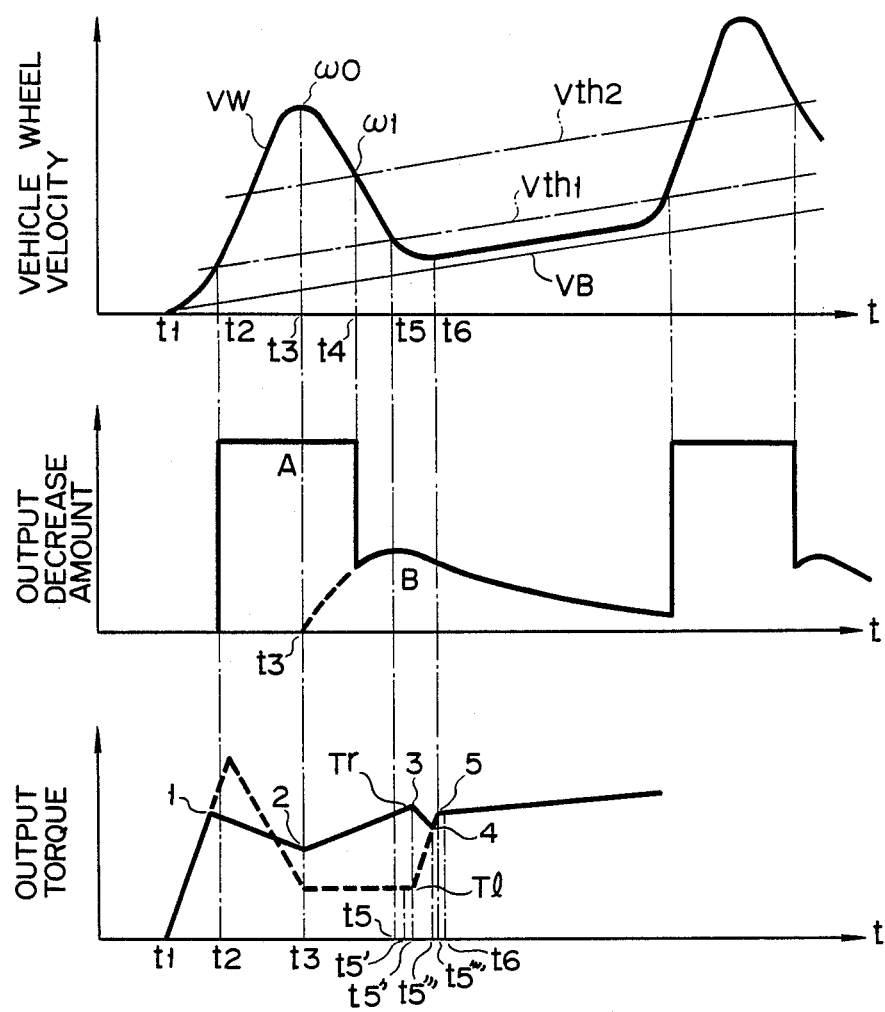
F I G. 6
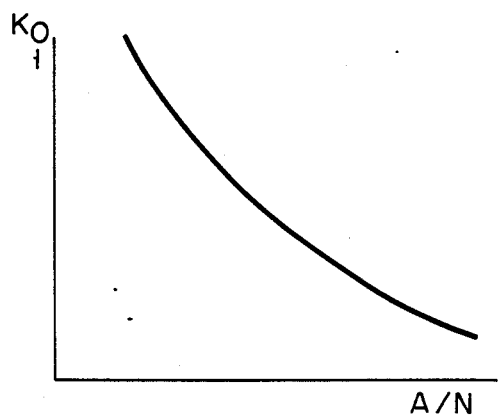
F I G. 7

FIG. 16-I
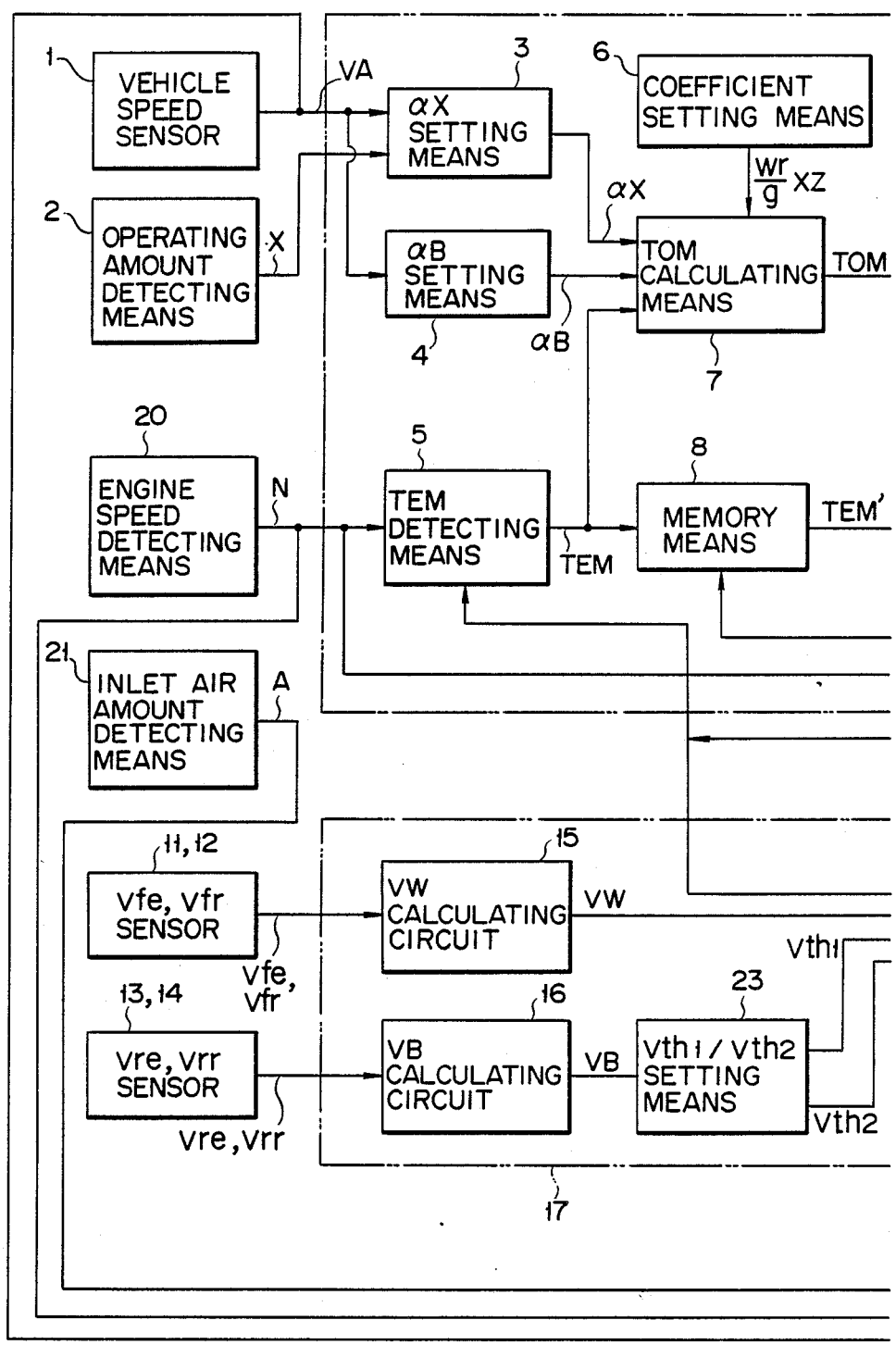

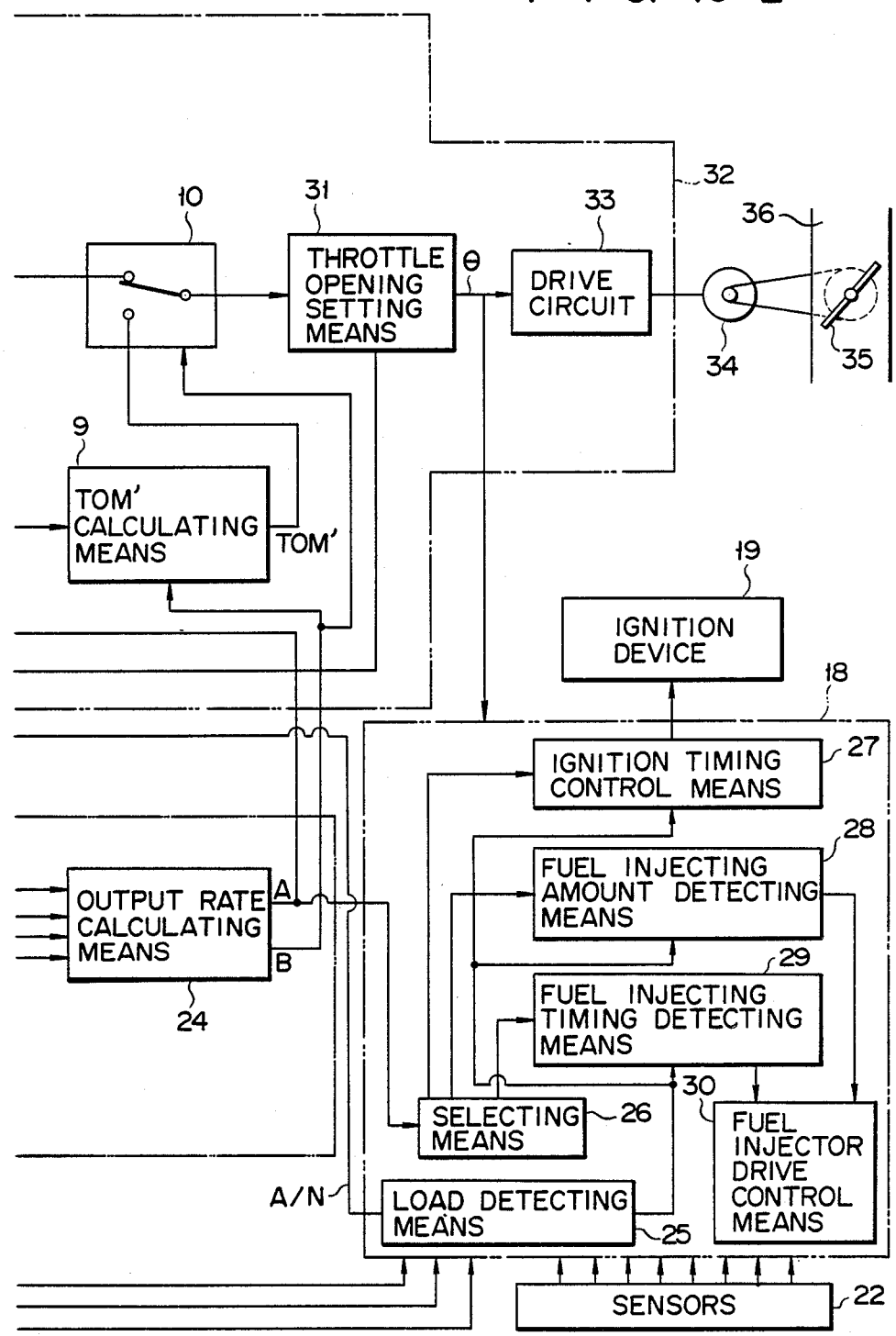
FIG. 16-II

4,933,857

TRACTION CONTROL APPARATUS FOR VEHICLE ENGINE

BACKGROUND OF THE INVENTION

1. Field of the Invention

The present invention relates to engine traction control for preventing the wheels of a vehicle from slipping during acceleration.

2. Description of the Related Art

When slip prevention on a slippery road surface or upon acceleration (e.g., start) of a vehicle mounting a high-output engine is performed by controlling an engine output, the following methods are known. In one method, an engine output is largely decreased in order to immediately stop a slip upon detection of the slip. When a slip amount of a differential value of a driving wheel velocity is decreased below a predetermined value, the engine output is restored (method A). In another method, in order to achieve smooth control, the engine output is restored slowly (method B). In still another method, a slip of a vehicle is slowly suppressed (method C: Japanese Patent Disclosure (Kokai) No. 61-115729).

However, in method A, since the engine output is restored immediately after the slip is stopped, a slip occurs again. In method B, it takes too much time to restore a decreased engine output to an optimal value, resulting in an acceleration loss. In method C, a slip time is long, resulting in poor operability.

SUMMARY OF THE INVENTION

It is an object of the present invention to provide a traction control apparatus for vehicle engine, which controls an engine output by two steps to quickly recover from a slip of vehicle wheels. More specifically, according to the present invention, in the first step, instruction A for largely decreasing an engine output to immediately decrease the slip of vehicle wheels is output to an engine output control means. In the second step, an engine output according to a friction coefficient between a road surface and the tire is output as instruction B.

Therefore, when a slip occurs, engine output rate K0 smaller than an engine output required through an acceleration pedal is supplied to the engine output control means as instruction A to greatly decrease the engine output, thereby stopping the slip quickly. Then, engine output rate K1 which is larger than K0 and can provide sufficient road surface torque Tr is supplied to the engine output control means. Therefore, when the slip is stopped, an engine output high enough to drive vehicle wheels can be obtained, and a vehicle can be smoothly accelerated without causing a slip.

BRIEF DESCRIPTION OF THE DRAWINGS

FIGS. 3A and 3B are graphs showing vehicle wheel velocity VW as a function of time according to a control method of the present invention;

FIG. 6 is a graph showing changes over time in vehicle wheel velocity VW, output decrease amount, and output torque according to the first embodiment;

FIG. 7 is a graph showing the relationship between output rate K0 and A/N according to the first embodiment;

FIG. 16 is a block diagram showing a fifth embodiment of the present invention;

DETAILED DESCRIPTION OF THE PREFERRED EMBODIMENTS

The principle of the present invention will be described hereinafter in detail.

Figure 1:
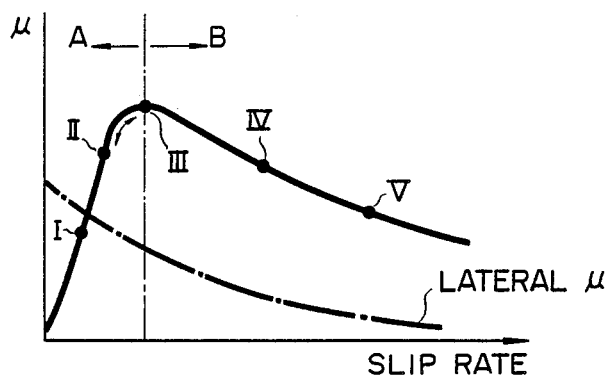
FIG. 1 is a graph showing the relationship between a slip rate and a friction coefficient of vehicle wheels with respect to a road surface.

Friction coefficient $\mu$ between vehicle wheels and a road surface has characteristics shown in FIG. 1 with respect to a slip rate.

The relationship among drive torque Tl of an engine output of a vehicle to vehicle wheels, road surface torque Tr transmitted from the vehicle wheels to the road surface, and rotational torque $I\dot{\omega}$ of the vehicle wheels is given by:

$$I\dot{\omega} = Tl - Tr \qquad (1)$$

$$Tr = \mu WR$$

I: rotational inertial moment of vehicle wheel
W: shared load to vehicle wheel
R: radius of vehicle wheel
$\omega$: rotational angular velocity of vehicle wheel In a stable region of FIG. 1, road surface torque Tr can be increased upon an increase in drive torque Tl, and $\omega$ is not immediately changed. An increase/decrease in drive torque Tl is normally performed within this stable region A. However, when a maximum value of $\mu$ is small on a slippery road surface or when a vehicle has a high-output engine, a slip is increased due to an excess drive torque, and the slip rate enters unstable region B shown in FIG. 1. More specifically, since the road surface torque is Tr=μWR and changes along the μ-slip rate curve shown in FIG. 1, an increase/decrease in drive torque can be followed between point I and III in FIG. 1, but cannot be increased more than μWR in III. Therefore, Tl>Tr, and Tl−Tr=I.ώ. As a result, the vehicle wheel velocity is increased to increase the slip, and the slip rate changes from IV to V in unstable region B in FIG. 1. Thus, μ is decreased, the slip rate is increased, road surface torque Tr is decreased, and an acceleration force of a vehicle body is decreased.

In slip prevention control (traction control), a slip is detected to control drive torque Tl so that the slip rate falls between point II and III in FIG. 1. In addition, the slip must be suppressed as early as possible. This is because if unstable region B continues for a long period of time, a lateral friction coefficient (lateral μ) is small and this results in poor operability.

In order to prevent this, drive torque Tl<< road surface torque Tr must be satisfied, and negatively large I.ώ must be obtained. However, when drive torque Tl is decreased in this manner to stop the slip, if restoration of drive torque Tl is delayed, the slip rate is decreased to point I of FIG. 1 although it falls within the stable region, and sufficient road surface torque Tr cannot be obtained. If the engine output is increased to quickly increase drive torque Tl in order to obtain sufficient road surface torque Tr at an early time, point III is immediately exceeded.

According to the present invention, μ near point II is estimated from a vehicle wheel velocity during a slip, and the engine output is controlled so that μ reaches point II immediately after the slip is stopped. Then, the drive torque is slowly increased from this point to prolong a time for which the stable region of II to III and a large road surface torque Tr are maintained, thereby achieving both good acceleration property and operability.

The estimation method of μ will be described below.

μ at point II is estimated from μ within the range of point III to V in FIG. 1. More specifically, when a slip occurs, the slip rate is increased from point III to V, and the engine output is decreased to yield drive torque Tl0 in order to prevent this. Then, in equation (1), Tl<Tr at point IV, and I.ώ is negative. Thus, road surface torque Tr proportional to μ is given by:

$$Tr = \omega WR = Tl0 - I.\dot{\omega} \quad (2)$$

If a drive torque when no traction control is performed is given as Tl0, a gear ratio is given as ρ, and an output rate under the traction control is given as K0, the following relation is established:

$$Tl0 = K0.T0 = K0.\rho.Tl \quad (3)$$

Figure 2:
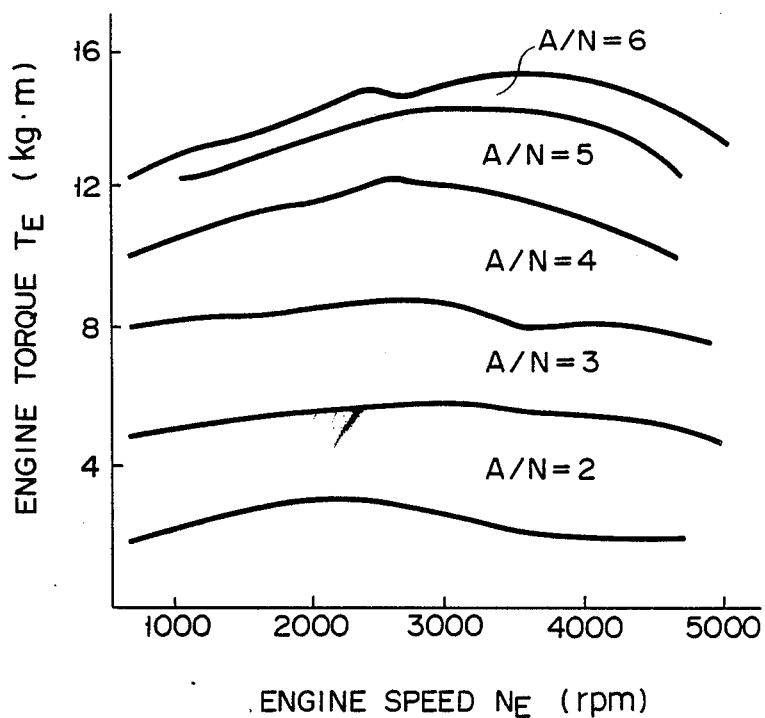
FIG. 2 is a graph representing A/N based on the relationship between an engine torque and an engine speed.

Tl is represented by A/N upon linearization based on an engine speed $N_E$−engine torque $T_E$ graph shown in FIG. 2, as follows:

$$\rho.Tl = a(A/N + b) \quad (4)$$

where a and b are constants, and A/N represents an engine load, which is calculated by (amount A of intake air)/(engine speed N). From equations (2), (3), and (4), road surface torque Tr is written as:

$$Tr = K0.a(A/N + b) - I.\dot{\omega} \quad (5)$$

A/N is always calculated by an engine output control means to determine a fuel injecting amount. K0 is an already determined value. Furthermore, ώ is a change rate of driving wheel velocity, which is calculated from a difference between a driving wheel velocity and a vehicle body velocity. A timing at which ώ is determined must be determined during a decrease in slip rate in consideration of response of an engine output, so that the drive torque Tr is restored before the slip is stopped. For example, the timing can be set when ώ<0 and slip amount DV (=difference between driving wheel velocity and vehicle body velocity) has reached a predetermined value, or when DV=DVmax×a predetermined rate (DVmax is maximum value of DV during the slip) and ώ<0.

A ratio of road surface torque Tr during restoration to output torque T0 when no traction control is performed is engine output rate K1 for obtaining drive torque Tr, and can be represented from equations (3), (4), and (5) as follows:

$$K1 = Tr/T0 = K0 - I.\dot{\omega}/[a(A/N + b)] \quad (6)$$

That is, when a slip of driving wheels is detected, instruction A is supplied to an engine output control means so as to immediately set an engine output rate to be K0. Subsequently, when ώ<0 and slip amount DV has reached a predetermined value, or when DV=DVmax×a predetermined rate during the slip and ώ<0, ώ(DV) is detected, and equation (6) is calculated. Instruction B having engine output rate K1 is supplied to the engine output control means. When ώ is not easy to obtain due to rotational variations of driving wheels, road surface torque Tr can be obtained by an integral value of the slip amount while the slip rate is decreased, in order to eliminate the influence of the variations.

Slip amount S during deceleration (point V to III in FIG. 1) in region of $S_A$ shown in FIG. 3A is given by:

$$S = \int\int \dot{\omega} dt^2 \quad (7)$$

From equation (1), equation (7) is rewritten as:

$$S = I(\omega^2 0 - \omega^2 1)/2(Tr - Tl) \quad (8)$$

ω0 is a maximum value of driving wheel velocity VW, as shown in FIG. 3B, and can be a substantially constant value according to various experiments. ω1 is a value when ώ<0 and slip amount DV has reached predetermined value Vth2, and is a constant value. Therefore, equation (8) can be rewritten as:

$$S = C/(Tr - Tl) \quad (9)$$

C: constant

From equations (3), (4), and (9), torque Tr transmitted to a road surface during deceleration can be represented by:

$$Tr = K0.a(A/N + b) + C/S \quad (10)$$

where S is obtained by integrating difference between driving wheel velocity VW and vehicle body velocity VB or vehicle wheel velocity Vth1 at which the slip is assumed to have started.

Engine output gate K1 necessary for obtaining road surface torque Tr required when the slip is stopped is given by:

$$K1 = \frac{Tr}{T0} = K0 + \frac{C}{S \cdot a(A/N + b)} \quad (11)$$

More specifically, when a slip of the driving wheels is detected, instruction A is supplied to the engine output control means to immediately set the engine output rate to be K0. Subsequently, when $\dot{\omega}<0$ and slip amount DV (difference between driving wheel velocity VW and vehicle body velocity VB or vehicle wheel velocity Vth1 at which the slip is assumed to have started) has reached a predetermined value, or when DV=DVmax×a predetermined rate during the slip and $\dot{\omega}<0$, equation (11) is calculated, and then, instruction B is supplied to the engine output control means to set engine output rate K1.

Therefore, when a slip occurs, engine output rate K0 smaller than an engine output required through an acceleration pedal is supplied to the engine output control means as instruction A to greatly decrease the engine output, thereby stopping the slip quickly. Then, engine output rate K1 which is larger than K0 and can provide sufficient road surface torque Tr is supplied to the engine output control means. Therefore, when the slip is stopped, an engine output high enough to drive vehicle wheels can be obtained, and a vehicle can be smoothly accelerated without causing a slip.

Figure 4:
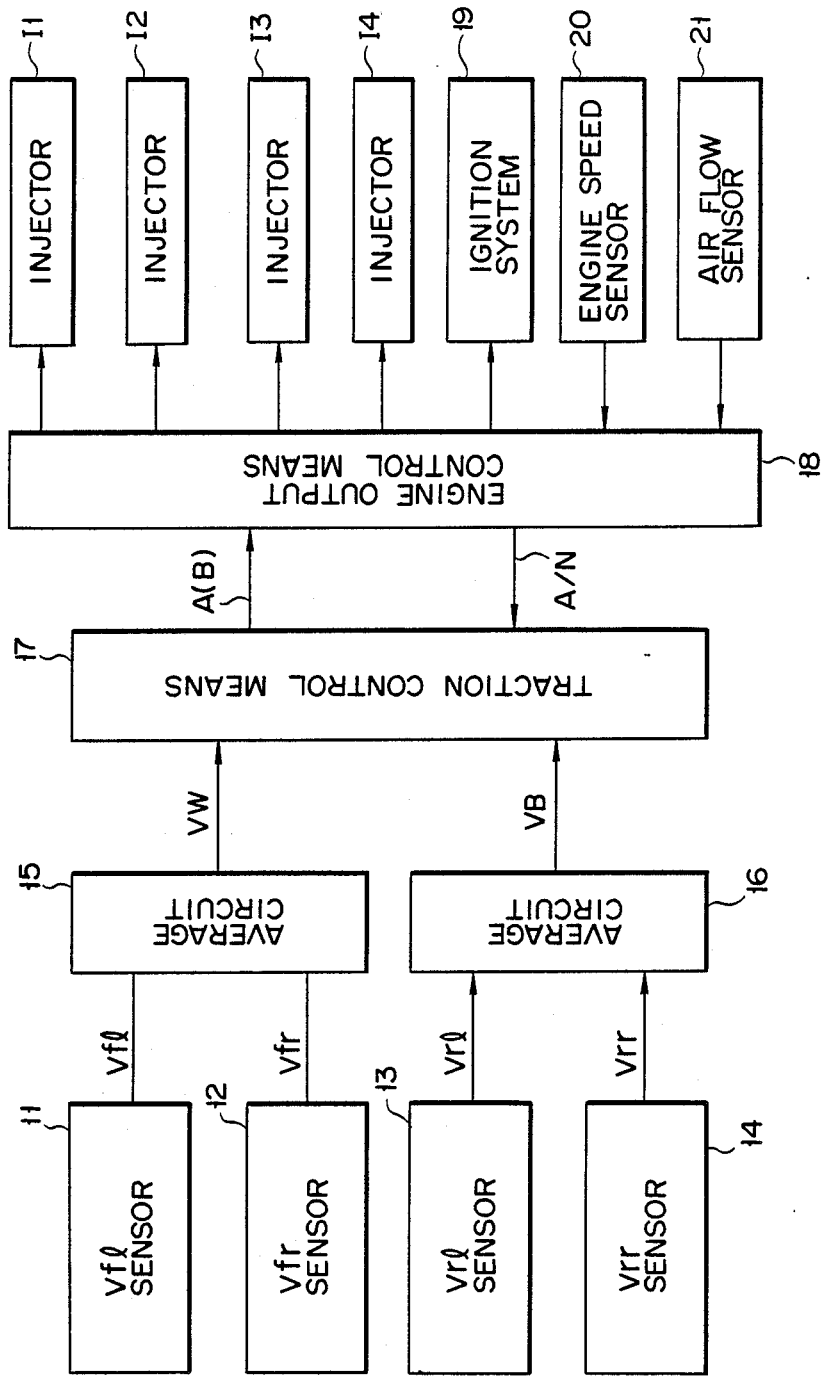
FIG. 4 is a block diagram showing a first embodiment of the present invention.

A first embodiment of the present invention will be described with reference to FIGS. 4 to 7. Referring to FIG. 4, Vfl sensor 11 is provided to a front left wheel of F—F vehicle to detect its driving wheel velocity Vfl. Vfr sensor 12 is provided to a front right wheel to detect its driving wheel velocity Vfr. Vrl sensor 13 is provided to a rear left wheel as a driven wheel to detect its vehicle wheel velocity Vrl. Vrr sensor 14 is provided to a rear right wheel to detect its vehicle wheel velocity Vrr. Average circuits 15 and 16 are respectively connected to Vfl and Vfr sensors 11 and 12, and Vrl and Vrr sensors 13 and 14, and average two outputs from the two vehicle wheel velocity sensors to calculate front vehicle wheel velocity (driving wheel velocity) VW and rear vehicle wheel velocity (driven wheel velocity or vehicle body velocity) VB. Traction control means 17 receives front and rear vehicle wheel velocities VW and VB from average circuits 15 and 16, and performs calculations and decisions shown in the flow chart of FIG. 5 so as to output instructions A and B. Engine output control means 18 receives the outputs from engine speed sensor 20, air flow sensor 21, and a water temperature sensor, a crank angle sensor, a vehicle velocity sensor (which are not shown), and the like, and calculates injecting times and timings of injectors I1 to I4 of an engine (not shown) to output drive signals to injectors I1 to I4. In addition, control means 18 outputs an ignition timing signal to ignition system 19, and also outputs an A/N signal (A=amount of intake air, N=engine speed) to traction control means 17.

The operation will be described below.

Figure 5A:
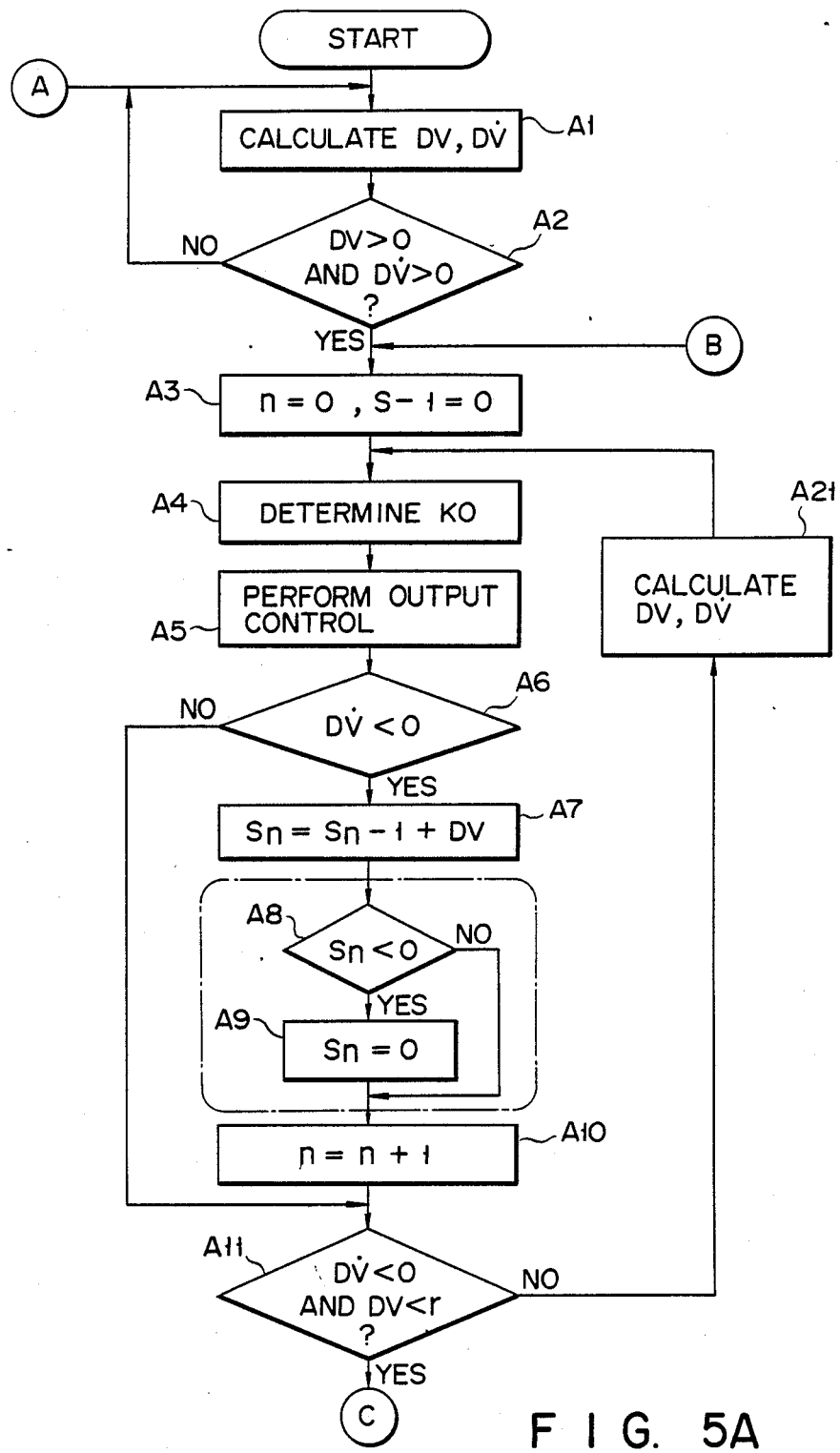
FIGS. 5A and 5B are flow charts of the first embodiment.
Figure 5B:
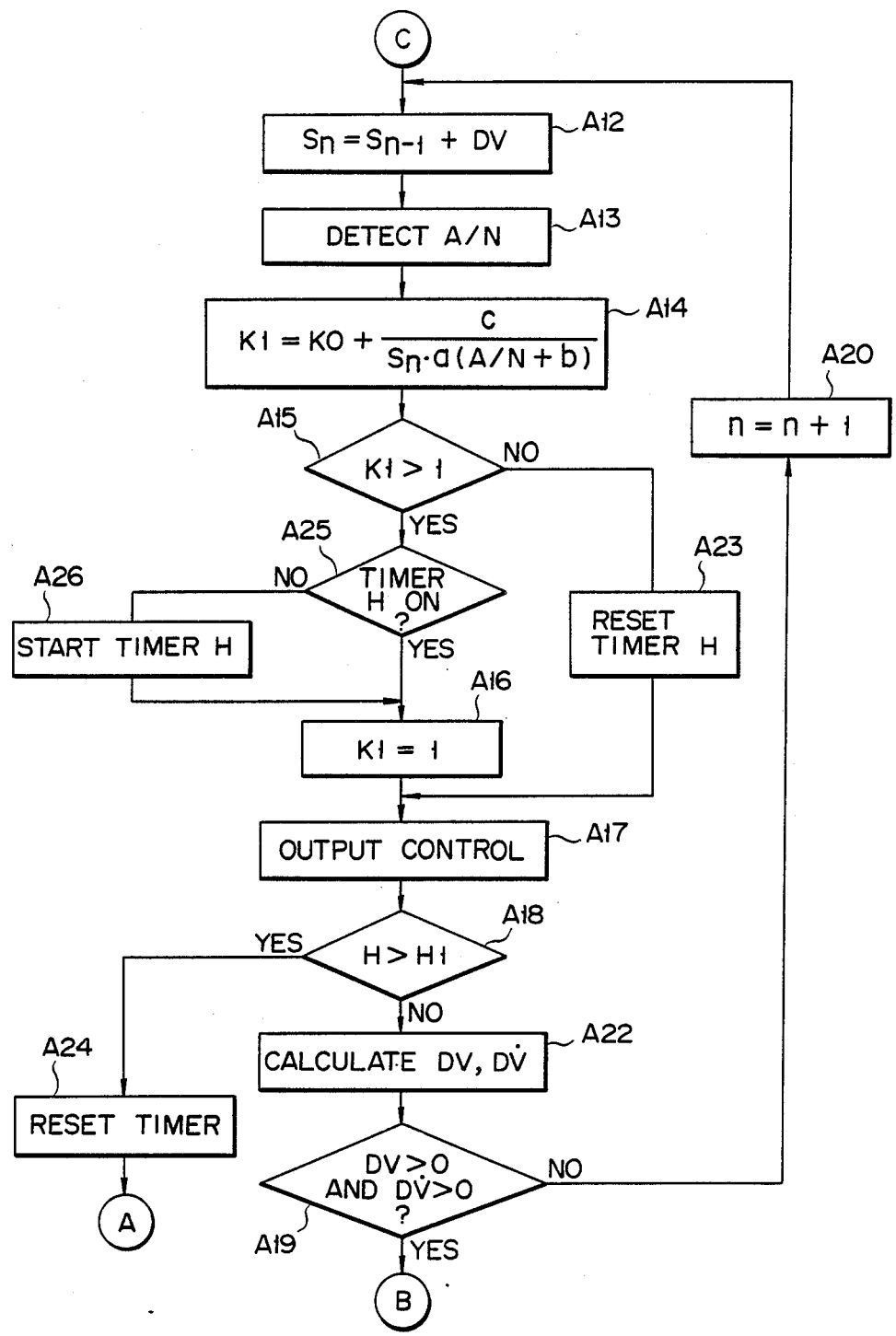
Figure 8:
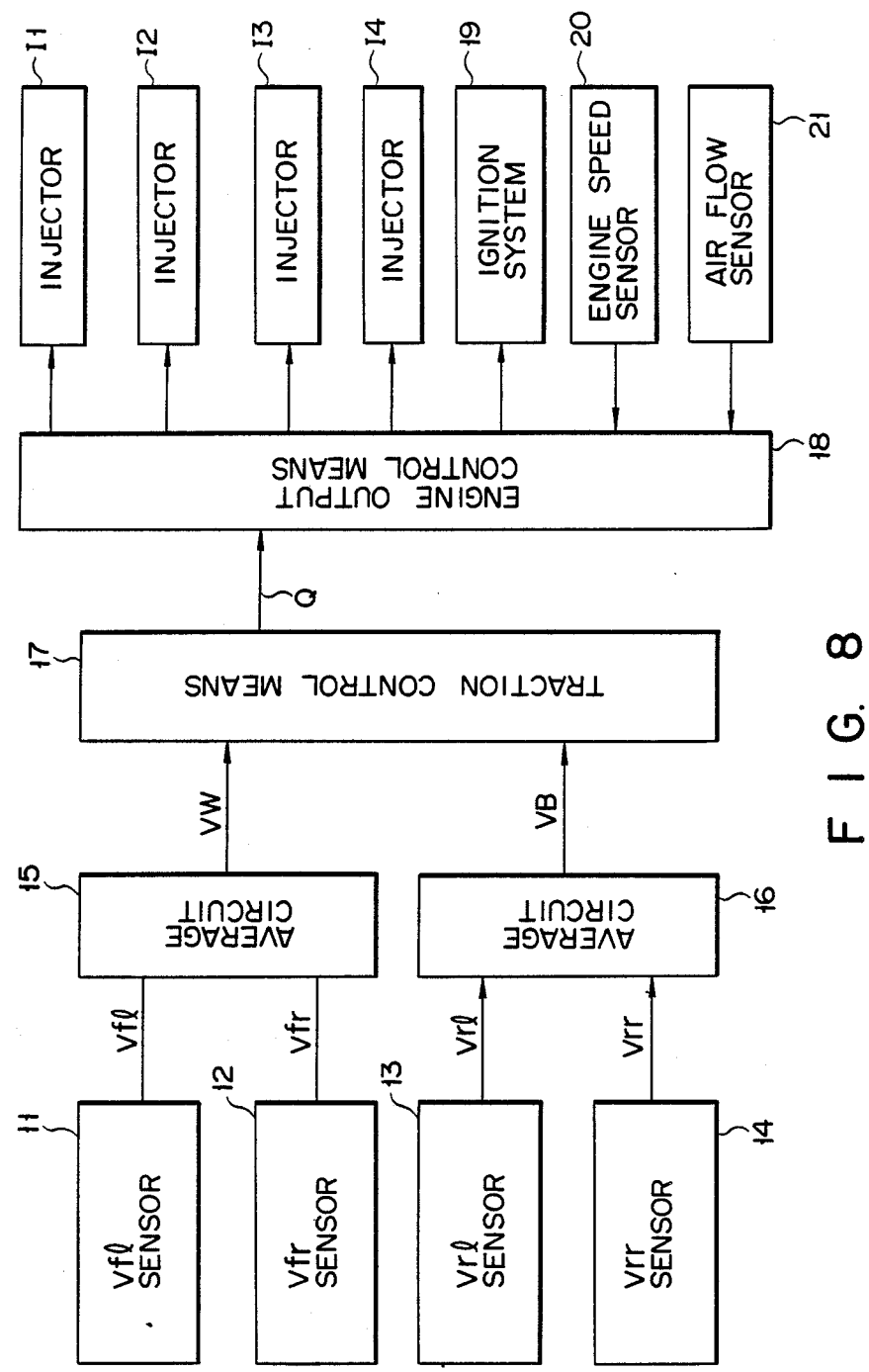
FIG. 8 is a block diagram showing a second embodiment of the present invention.

When a vehicle is started, sensors 11 to 14 supply output signals Vfl, Vfr, Vrl, and Vrr corresponding to vehicle wheel velocities to average circuits 15 and 16. Average circuits 15 and 16 average values of right and left wheels, and output front vehicle wheel velocity VW and rear vehicle wheel velocity (vehicle body velocity) VB to traction control means 17. If a road surface is slippery like a snow- or ice-covered road, front vehicle wheel velocity VW is abruptly increased, as shown in FIG. 6, and front wheels begin to idle. Traction control means 17 calculates DV and $D\dot{V}$ in step A1, as shown in FIG. 5. DV=VW−Vth1, and Vth1 shown in FIG. 6 is a threshold value used to determine if traction control is to be performed. Therefore, if DV>0, this means that VW exceeds Vth1, and if $D\dot{V}>0$, this means that the slip rate is increased. Thus, when DV>0 and $D\dot{V}>0$, traction control is started. When a vehicle is started on a slippery road surface, front vehicle wheel velocity VW exceeds Vth1 at time t2, as shown in FIG. 6 and is further increased. Therefore, in step A2, DV>0 and $D\dot{V}>0$, and the flow advances to step A3 to set n=0 and S−1=0. In step A4, based on an A/N value input from engine output control means 18, K0, i.e., an engine output rate of instruction A is calculated from a K0-A/N curve shown in FIG. 7. In step A5, traction control means 17 outputs engine output rate K0 as instruction A to engine output control means 18. Engine output control means 18 corrects (decreases) fuel injecting amount (fuel injecting time) F0 calculated based on input signals from various sensors by multiplying it with K0 to calculate real fuel injecting amount F=K0.F0, and drives (opens) injectors I in accordance with amount F.

Road surface torque Tr is increased from time t1, as shown in FIG. 6. When Vw is increased, a slip occurs in a time interval between times t1 and t2, and torque Tr is decreased. It is checked in step A6 if $D\dot{V}<0$. Since time t2 shown in FIG. 6 has just passed and instruction A was output, a decrease in engine output is not enough. Therefore, front vehicle wheel velocity VW is increasing, and $D\dot{V}<0$ is not established. "NO" is thus obtained in step A6, and the flow advances to step A11.

In step A11, since DV>0 and DV>0, as described above, "NO" is obtained, and the flow advances to step A21 to calculate DV and DV. After step A21, the flow returns to step A4, and K0 is calculated from A/N. In step A5, K0 is output to the engine output control means 18 as instruction A, thereby decreasing an engine output.

Since the slip rate of the front wheels is increasing during a time interval between times t2 and t3, road surface torque Tr is decreased, as shown in FIG. 6.

When the engine output is sufficiently decreased and a t3 time interval has passed, $D\dot{V}(\omega 0)<0$, and front vehicle wheel velocity Vw begins to decrease. Therefore, "YES" is obtained in step A6, and the flow advances to step A7 to set SO=DV. It is then checked in step A8 if SO<0. In this case, since SO>0, the flow advances to step A10 to increment n by one. The flow then advances to step A11. In this case, since time t3 shown in FIG. 6 has just passed, VW is present between $\omega 0$ and $\omega 1$ in FIG. 6, and hence, $D\dot{V}<0$. However, since DV>Vth2=Vth1+γ(=5), "NO" is obtained in step A11, and control in steps A21, and A4 to A11 is again performed. During this interval (t3 to t4), the engine output is largely decreased by the output decrease amount (1/K0), as shown in FIG. 6, and hence, vehicle wheel velocity VW is decreased to restore the road surface torque Tr.

The above-mentioned steps are repeated, and front vehicle wheel velocity VW is decreased. When DV<Vth2 at time t4 shown in FIG. 6, "YES" is obtained in step A11, and Sn=Sn−1+DV in step A12. Then, the A/N value from the engine output control means 18 is fetched in step A13.

Sn=Sn−1+DV in steps A7 and A12 is an integral value of an area surrounded by vehicle wheel velocities VW and Vth1 in FIG. 6 per unit time, and the integral value is S in equation (8).

In step A14, K1, i.e., a value of instruction B is calculated from equation (11). Since K0, Sn, and A/N are already calculated in steps A4, A12, and A13, respectively, K1 can be calculated.

In step A15, since time is between t4 and t5, $Sn=S_A$ in FIG. 3. Therefore: K1<1 and "NO" is obtained in step A15. The flow advances to step A17, and K1 is output from traction control means 17 to engine output control means 18 as instruction 8. Engine output control means 18 corrects (decreases) fuel injecting amount (fuel injecting time) F0 by multiplying F0 with K1 to calculate real fuel injecting amount F=K1.F0, and drives (opens) injectors I in accordance with amount F.

It is checked in step A18 if time H of a timer H is larger than H1. However, since the timer H is reset in step A23, "NO" is obtained in step A18, and the flow advances to step A22. In step A22, DV and DV are calculated based on VW and VB from average circuits 15 and 16, and it is checked in step A19 if DV>0 and DV>0. In this case, since instruction B was already output, time t is between t4 and t5 in FIG. 6, and the front vehicle wheel velocity is decreasing. Therefore, DV<0, and "NO" is obtained in step A19. In step A20, n is incremented by one, and the flow then advances to step A12.

The cycle of steps A12 to A15, A23, A17, A18, A22, A19, A20, and A12 is repeated until time t5 in FIG. 6 is reached. During this cycle, $S_A$, i e., an area of Sn is increased, as shown in FIG. 3. Therefore, as can be seen from equation (11), K1 is decreased from time t4 to time t5. More specifically, the output decrease amount (I/K1) shown in FIG. 6 is increased, and during this interval, the engine output is decreased from the value at time t4 during a time interval of t4 to t5. During a time interval between t4 and t5, the engine output is decreased as in the interval between t3 and t4, and road surface torque Tr is restored.

When front vehicle wheel velocity VW is decreased below Vth1 (after time t5), DV<0, and hence, Sn in step A12 is decreased. Therefore, while the step cycle is repeated, K1 is increased to cause the engine output to increase. In this case, front vehicle wheel velocity VW is further decreased from time t5, and becomes substantially equal to vehicle body velocity VB at time t6.

When this state is maintained and K1≧1, K1=1 in step A16 and timer H is started. The step cycle is further repeated, and when H>H1, K1=1, i.e.. no slip occurs for an H1 time interval. Therefore, it is determined in step A18 that traction control is unnecessary, and timer H is reset in step A24. Then, the flow returns to step A1.

After time t5, engine output rate K1 begins to increase, and the engine output is increased. However, an increase in engine output does not occur at time t5 due to a delay time in an engine control system, but begins at time t5'. Therefore, during a time interval between times t5 and t5', vehicle wheel velocity VW is decreased, while road surface torque Tr is increased.

At time t5', the drive torque Tl of the engine begins to increase. However, the drive torque Tl as indicated by a broken curve in FIG. 6 has been decreased by instructions A and B and becomes a value sufficiently smaller than the road surface torque Tr. For this reason, even if the engine output is increased, it does not coincide with the road surface torque Tr. Therefore, road surface torque Tr is decreased due to the friction on the road surface during a time interval between times t5'' and t5'''. At time t5''', engine drive torque Tl coincides with road surface torque Tr, and is further increased. Therefore, a decrease in vehicle wheel velocity Vw is suppressed by torques Tr and Tl. At time t5'''', the slip rate is decreased, and the friction force is restored. Thus, vehicle wheel velocity VW is increased to be substantially equal to vehicle body velocity VB due to drive torque Tl.

While the above-mentioned step cycle (A12 to A18, A22, A19, A20, A12) is repeated and K1 is gradually increased, if a slip occurs again, and DV>0 and DV>0, the flow returns from step A19 to step A3, and traction control is restarted from the beginning.

If K1>1 after the above-mentioned step cycle is repeated, the flow advances from step A15 to A26, and timer H is started. In step A16, K1=1. After the step cycle is repeated for an H1 time interval, the flow advantages from step A18 to step A24 to reset timer H. Then, the flow returns to step A1.

More specifically, when a slip does not occur for a predetermined period of time after K1 has been set to 1 at time t6 so as not to decrease the engine output, traction control is ended.

Note that Vth1 is a velocity used to determine that the front vehicle wheels begin to slip, and can be selected as follows based on characteristics of a vehicle, engine characteristics, and other conditions.

(1) Vth1=VB+X
(2) Vth1=α.VB
(3) Vth1=α.VB+X
(4) Vth1=VB+X (VB<Y)
　　=α.VB (VB≧Y)
(5) Vth1=VB+X (VB<Y)
　　= α.VB (Y≦VB≦Z)
　　=VB+X' (Z<VB)

where X, X', Y, and Z are constant vehicle velocities, and α is a coefficient.)

Therefore, immediately after the slip occurs, traction control means 17 outputs output rate K0 as instruction A to engine output control means 18, and hence, the drive torque Tl of the front vehicle wheels begins to decrease. Thus, the slip rate can be decreased quickly. Engine output rate K1 when the slip is stopped is set to be a value according to road surface torque Tr, and thereafter, engine output rate K1 is increased in accordance with road surface torque Tr, i.e., μ. Therefore, even if the engine output is increased after the slip is stopped no slip occurs again. Furthermore, engine output rate K1 corresponding to road surface torque Tr is supplied to engine output control means 18 when vehicle wheel velocity VB is Vth2 larger than Vth1, thus preventing a delay time of engine response.

In this embodiment, Vth2 is determined to be Vth1+γ(=5 km/h). However, optimal value γ may be selected upon a variety of experiments.

In this embodiment, an engine fuel injecting amount is controlled in accordance with engine output rates K0 and K1 so as to control the engine output. However, if the ignition timing is controlled to decrease the engine output, the same effect as described above can be obtained.

A second embodiment of the present invention will now be described with reference to FIGS. 8 to 11.

In this embodiment, engine output rate K0 obtained by instruction A is determined by $D\dot{V}$ in place of A/N in the first embodiment. Engine output rate K1 obtained by instruction B is determined by a map defining the relationship between slip amount S and A/N. The same reference numerals in this embodiment denote the same parts as in the first embodiment, and the detailed description thereof will be omitted.

Figure 9:
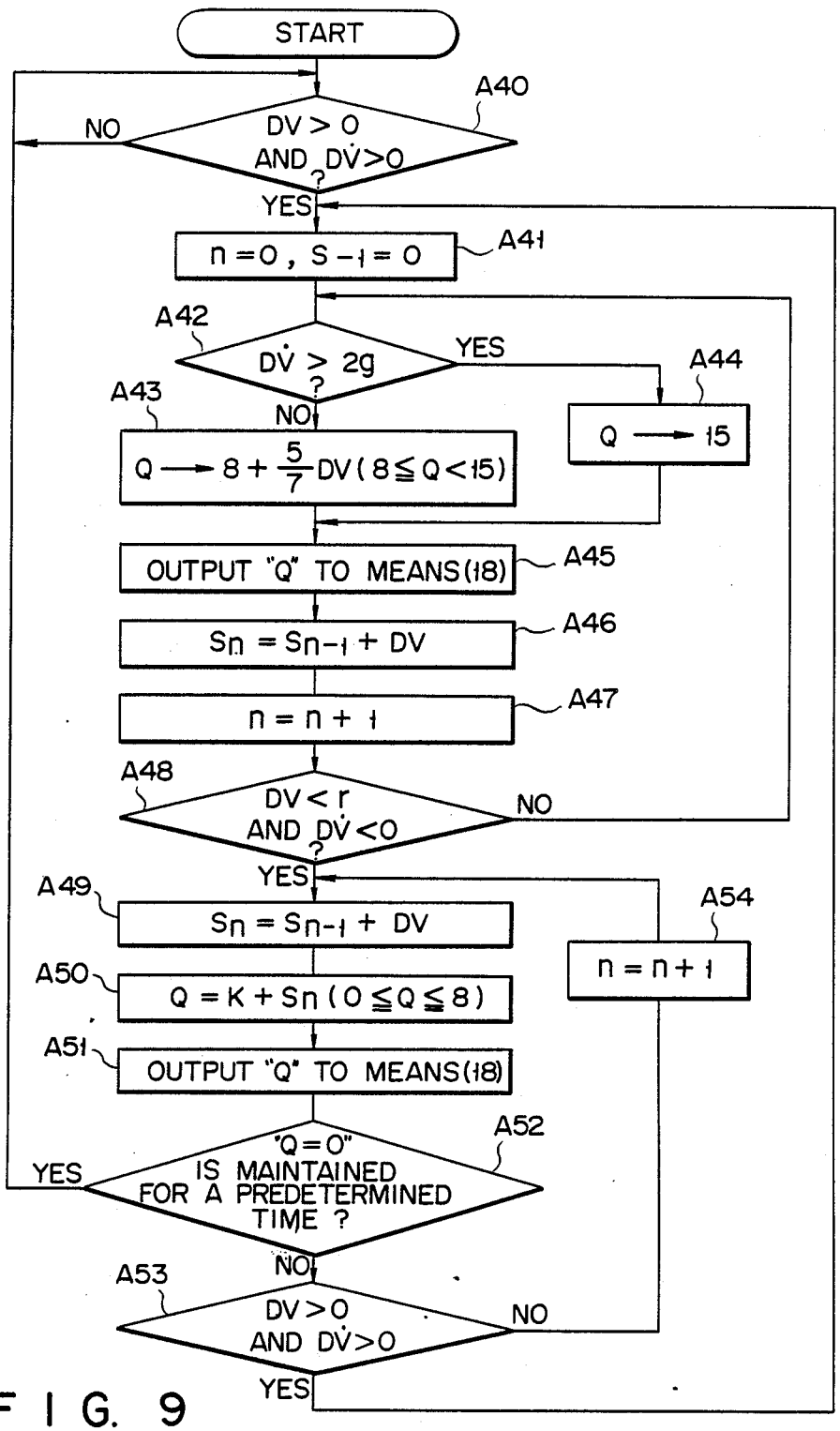
FIG. 9 is a flow chart of the second embodiment.
Figure 10:
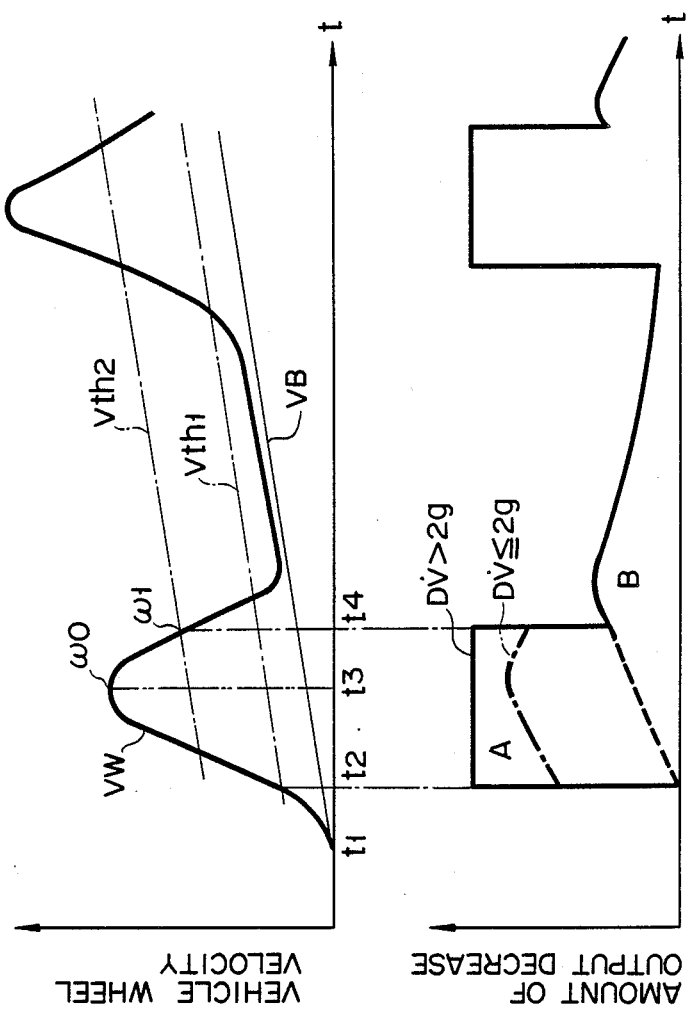
FIG. 10 is a graph showing changes over time in vehicle wheel velocity VW and output decrease amount according to the second embodiment.
Figure 11:
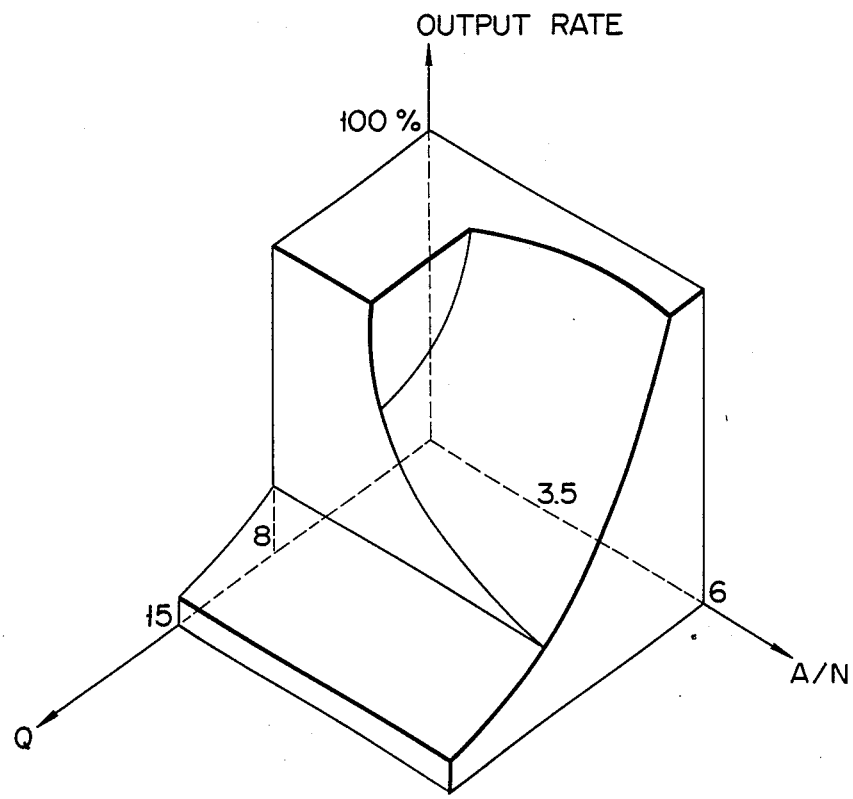
FIG. 11 is a map showing the relationship among instruction value Q, A/N, and output rate K according to the second embodiment.

In FIGS. 8 to 11, traction control means 17 outputs instruction value Q based on instructions A and B, and engine output control means 18 reads out output rate K using a map shown in FIG. 11 based on instruction value Q and A/N.

The operation will be described below.

Referring to FIG. 10, when an operator depresses an acceleration pedal to start a vehicle on a slippery road surface, front vehicle wheel velocity VW exceeds Vth1 at time t2, as shown in FIG. 10, and the slip rate tends to increase. Therefore, $DV>0$ and $D\dot{V}>0$. If "YES" is determined in step A40, $n=0$ and $S-1=0$ are set in step A41, and the flow advances to step A42.

It is checked in step A42 if $D\dot{V}>2g$. Although the degree of slip is large, i.e., if $D\dot{V}>2g$, value Q is set to be 15 in step A44, and the flow advances to step A45. When the degree of slip is not so large, i.e., if $D\dot{V}\leq2g$, the flow advances to step A45, and $Q=8+(5/7)DV$ ($8\leq Q<15$). In step A45, traction control means 17 outputs value Q to engine output control means 18 as instruction A.

Engine output control means 18 calculates engine output rate K0 using the map shown in FIG. 11 based on the input Q value and the A/N value calculated based on data obtained from air flow sensor 21 and the engine speed sensor 20. Engine output control means 18 calculates fuel injecting amount (fuel injecting time) F0 based on input signals from a variety of sensors, and calculates real fuel injecting amount $F=K0.F0$ from these results. Then, means 18 controls a valve opening time of injectors I1-I4 in accordance with amount F. Thus, the engine output is decreased.

In step A46, $S0=DV$, and in step A47, $n=1$. In step A48, it is then checked based on the current DV if $DV<\gamma$ and $D\dot{V}<0$. In this case, since a time is between t2 and t3, $D\dot{V}>0$, and hence, "NO" is obtained in step A45. The flow returns to step A42.

While this routine is repeated, if front vehicle wheel velocity $VW<Vth2=Vth1+\gamma$ due to a decrease in engine output, since $DV<\gamma$ and $D\dot{V}<0$, "YES" is determined in step A48.

In step A49, $Sn=Sn-1+DV$, and in step A50, instruction value $Q=K.Sn$ is calculated based on Sn obtained in step A49. In step A51, instruction value Q is output to engine output control means 18 as instruction B. Means 18 reads out engine output rate K1 from the map shown in FIG. 11 based on the A/N value and the Q value. Means 18 calculates real fuel injecting amount $F=K1.F0$ in accordance with already calculated fuel injecting amount F0 and engine output rate K1, and controls the valve opening time of injectors I1-I4 in accordance with amount F.

It is checked in step A52 if $Q=0$ is maintained for a predetermined period of time. Since "NO" is determined at time t4 in step A52, the flow advances to step A53, and DV and $D\dot{V}$ are calculated from vehicle wheel velocity VW and vehicle body velocity (rear vehicle wheel velocity) VB and it is checked if $DV>0$ and $D\dot{V}>0$. In this case, since time t4 has just passed, $D\dot{V}<0$, and hence, "NO" is determined in step A53. In step A54, $n=n+1$ is executed and the flow advances to step A49. Steps A50 to A54, and A49 are repeated, and thereafter, front vehicle wheel velocity VW substantially coincides with vehicle body velocity VB. In step A50, $Q=0$, and if $Q=0$ is maintained for a predetermined period of time, "YES" is determined in step A52. More specifically, a slip of driving wheels does not occur, and a 100% engine output defined by the acceleration pedal can be generated to accelerate (start) a vehicle. Thus, traction control can be ended. Therefore, the flow returns from step A52 to "start".

If a road surface becomes more slippery and the slip rate is again increased while steps A49 to A54 are repeated after time t4, $DV>0$ and $D\dot{V}>0$ are established, and hence, "YES" is determined in step A53. The flow then returns to step A41, and control after time t2 in FIG. 10 is repeated.

Therefore, the same effect as in the first embodiment can be provided. In this embodiment, an instruction value is output from traction control means 17 to engine output control means 18 as instruction A, and output rates K0 and K1 are calculated by means 18 using the map shown in FIG. 11. However, if the map shown in FIG. 11 is provided to traction control means 17, output rate K0 can be output as instruction A, and output rate K1 can be output as instruction B.

In this embodiment, the fuel injecting amount is controlled in accordance with output rates K0 and K1. However, if the ignition timing is controlled, the same effect as described above can be obtained.

Figure 12A:
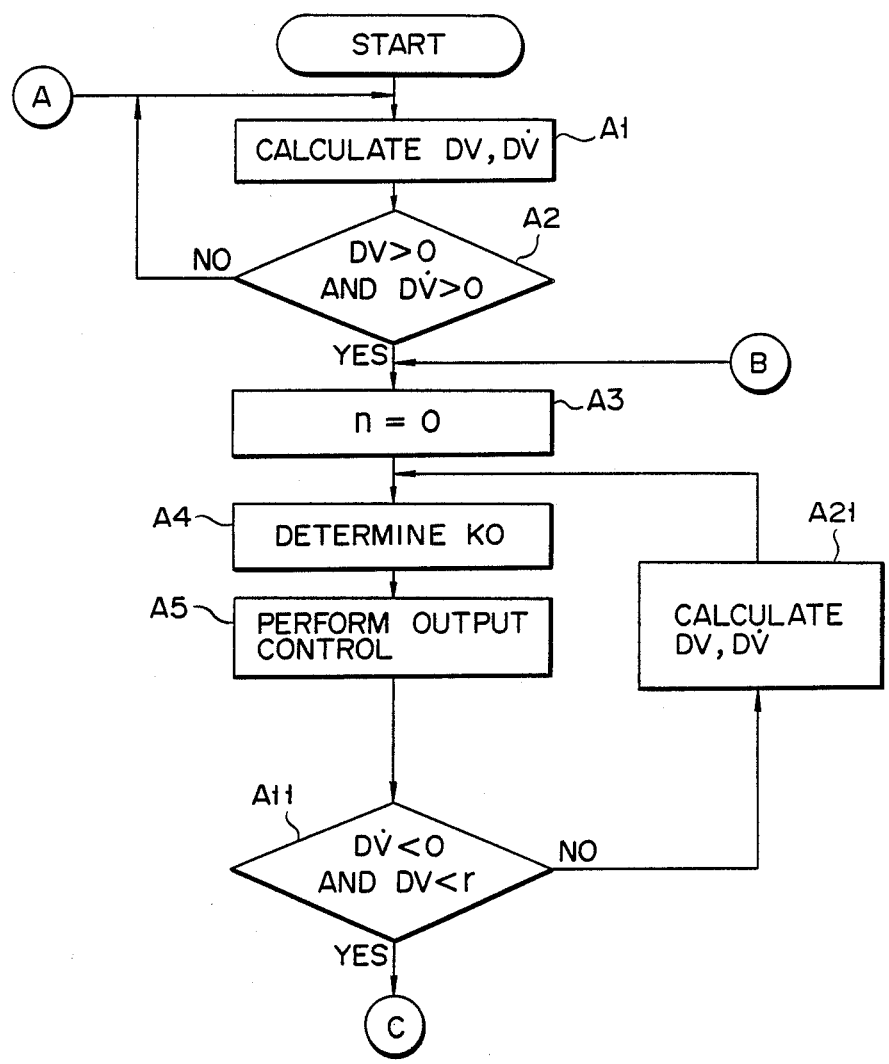
FIGS. 12A and 12B are flow charts showing a third embodiment of the present invention.
Figure 12B:
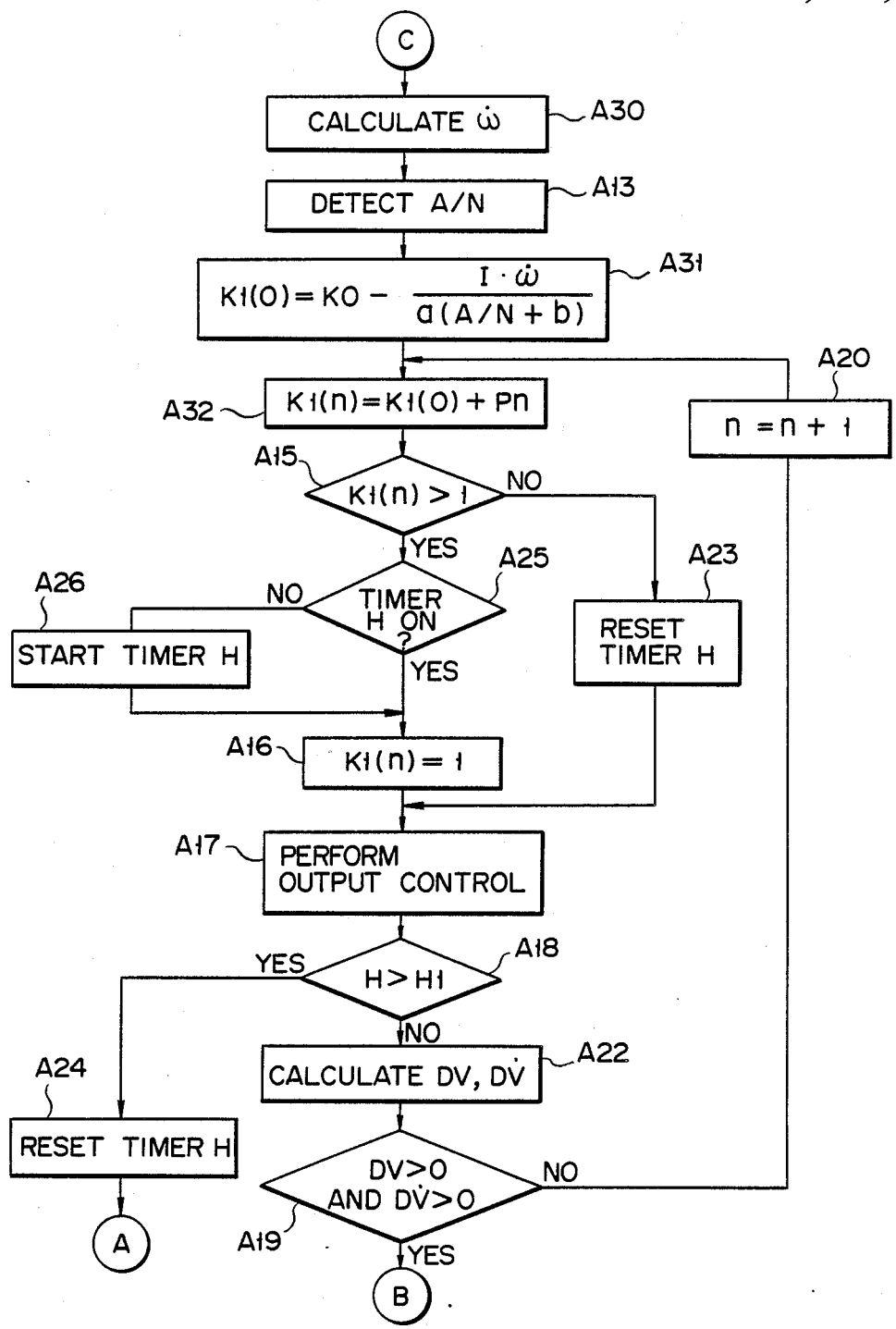

A third embodiment of the present invention will be described with reference to FIGS. 12A and 12B and FIG. 13.

In the third embodiment, K1 is calculated using equation (6) in place of equation (11) in the first embodiment. The same reference numerals in this embodiment denote the same parts as in the first embodiment, and a detailed description thereof will be omitted.

Figure 13:
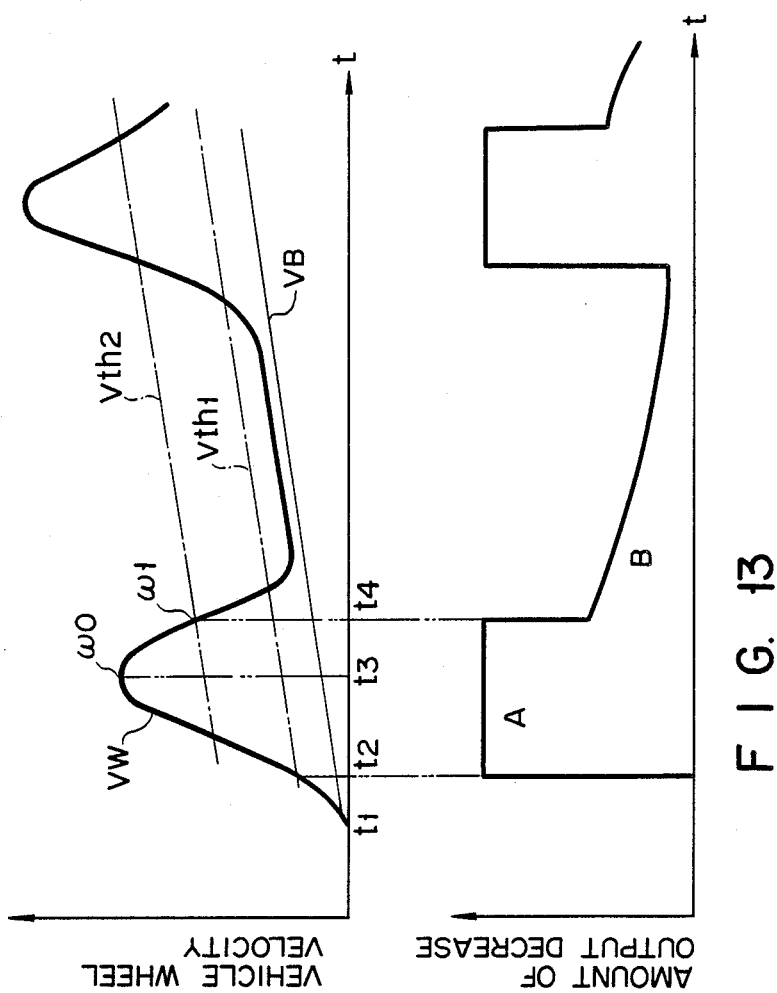
FIG. 13 is a graph showing changes over time in vehicle wheel velocity VW and output decrease amount according to the third embodiment.

When an acceleration pedal of a stationary vehicle on a slippery road surface is depressed to start the vehicle, the front vehicle wheels slip, and front vehicle wheel velocity VW is increased from time t1 and exceeds slip determination vehicle wheel velocity Vth1 at time t2, as shown in FIG. 13. Since $DV>0$ and $D\dot{V}>0$, "YES" is determined in step A2 in the flow chart of FIG. 12, and $n=0$ is set in step A3. Then, the flow advances to step A4 to determine engine output rate K0 from the A/N-K0 map shown in FIG. 7. Traction control means 17 outputs output rate K0 as instruction A to engine output control means 18, thus decreasing the engine output.

Since conditions $DV<\gamma$ and $D\dot{V}<0$ cannot be established until time t4, the cycle of steps A11, A21, A4, A5, and A11 is repeated.

Upon decrease in engine output, vehicle wheel velocity VW is decreased. Since $DV (=VW-Vth1)<\gamma$ is established at time t4, "YES" is determined in step A11. In step A30, acceleration $\dot{\omega}$ of the vehicle wheels at time t4 is calculated, and in step A13, A/N data is fetched from engine output control means 18. In step A31, K11(0) is calculated based on K0, $\dot{\omega}$, and A/N. In step A32, since $n=0$, $K1(0)=K1(0)$ is established, and the flow advances from step A15 to step A17 through step A23. Then, traction control means 17 outputs K1(0) as instruction B to engine output control means 18, thus restoring the engine output. Note that the engine output decreasing rate (1/K0) output in response to instruction A and that (1/K1(0)) output in response to instruction B are as shown in the lower graph of FIG. 13.

The flow advances to step A19 through steps A18 and A22. In this case, since the slip rate is not increased but is decreased, as shown in FIG. 13, $n=n+1$ is executed in step A20. In step A32, K1(1)=K1(0)+P is set, and K1(1) is output to engine output control means 18 as instruction B in step A17. The step cycle of steps A17, A18, A22, A19, A20, A32, A15, A23, and A17 is repeated. Thus, K1(n) is gradually decreased, and output decreasing late 1/K1(n) of instruction B is gradually decreased, as shown in the lower graph in FIG. 13.

When the value K1(n) exceeds 1, timer H is operated in step A26. If timer H>H1 after the step cycle of steps A25, A16, A17, A18, A22, A19, A20, A32, A15, and A25 is repeated, no slip occurs for an H1 time interval even if the engine output rate is set to be 100%. Therefore, the flow returns to "start" through steps A18 and A24, and traction control is ended.

Therefore, the same effect as in the first embodiment can be obtained.

In the third embodiment, a fuel injecting amount is controlled in accordance with output rates K0 and K1. However, the same effect as described above can be obtained if an ignition timing is controlled.

Figure 14:
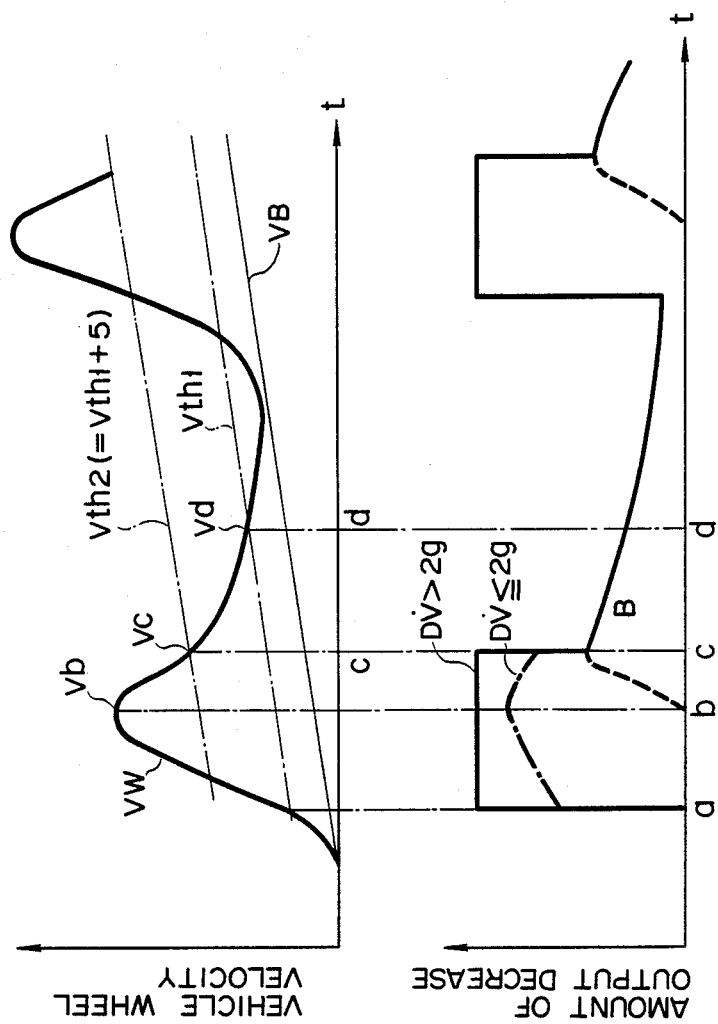
FIG. 14 is a graph showing changes over time in vehicle wheel velocity VW and output decrease amount according to a fourth embodiment of the present invention.
Figure 15A:
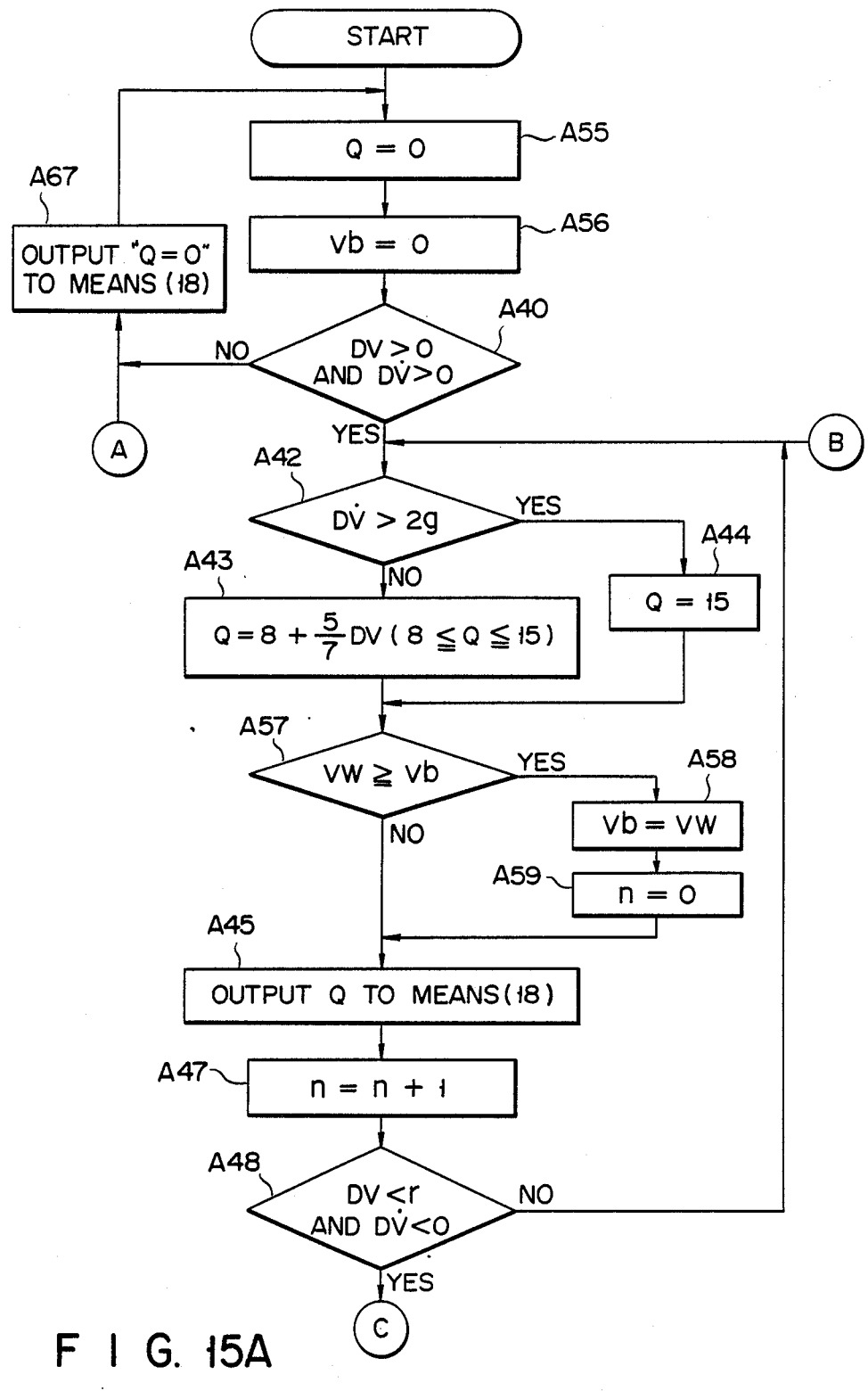
FIGS. 15A and 15B are flow charts of the fourth embodiment.
Figure 15B:
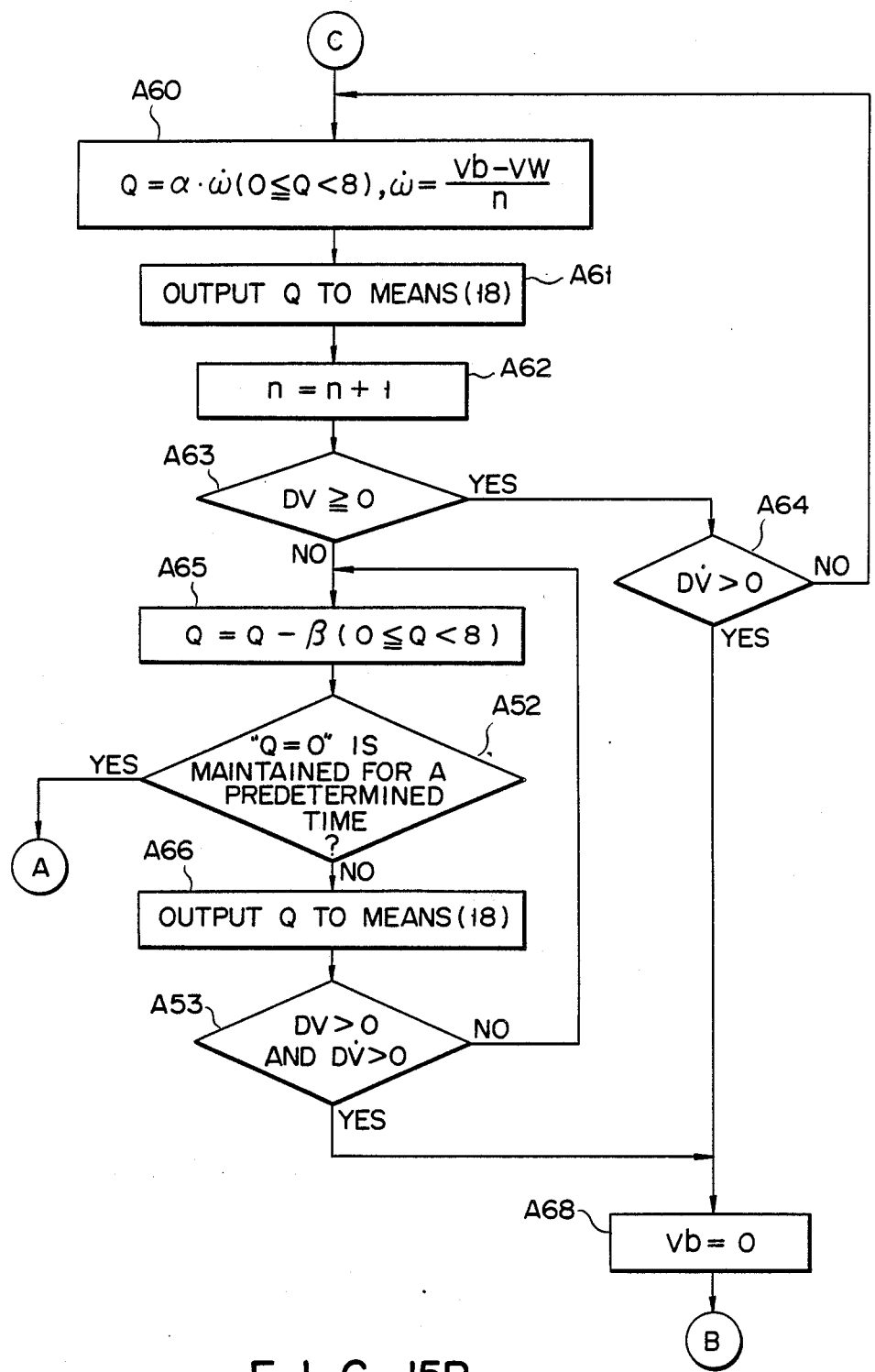

In a fourth embodiment shown in FIGS. 14 and 15, engine output rate K0 obtained by instruction A is determined by V instead of A/N in the third embodiment. Engine output rate K1 obtained by instruction B is determined based on $\dot{\omega}$ and A/N, and the same control operation as in the second embodiment is performed. When driving wheels slip upon starting of a vehicle, vehicle wheel velocity VW is abruptly increased, and exceeds slip determination vehicle wheel velocity Vth1 at time a in FIG. 14. Then, "YES" is determined in step A40, and it is checked in step A42 if $D\dot{V}>2g$. If $D\dot{V}>2g$, instruction value Q is set to be 15 in step A44. However, if $D\dot{V}\leq 2g$, instruction value Q is set to be $Q=8+(5/7)DV$ ($8\leq Q\leq 15$), and the flow advances to step A57.

Since maximum vehicle wheel velocity Vb is set to be "0" as an initial value at time a, and hence, VW>Vb, "YES" is determined in step A57. In step A58, Vb=VW is set, and in step A59, n=0 is set. Then, the flow advances to step A45. In step A45, traction control means 17 outputs instruction value Q as instruction A to engine output control means 18. Means 18 reads out output rate K0 from the map shown in FIG. 11 of the second embodiment in accordance with instruction value Q and A/N, and calculates real fuel injecting amount F=K0.F0 based on output rate K0 and fuel injecting amount F0 which is defined by A/N and other conditions. Means 18 controls a valve opening time of injectors I1-I4 in accordance with real fuel injecting amount F.

When a predetermined period of time has passed from step A45, n=0+1=1 is executed in step A47, and the flow advances to step A48. In this case since time is between times a and b, $D\dot{V}>0$, and hence, "NO" is determined in step A48. The flow advances to step A42. The cycle of steps A42, A43 or A44, A57, A45, A47, A48, and A42 is repeated. When time b has reached, VW=Vb is established. When time b has passed, VW begins to decrease, and hence, VW<Vb is established. Therefore, the flow advances from step A57 to A45, and Vb is not updated to maintain a maximum vehicle wheel velocity. When vehicle wheel velocity VW is decreased after time b and time c has reached, DV (=VW−Vth1)<γ and DV<0 are established. Then, "YES" is determined in step A48, and the flow advances to step A60.

In step A60, instruction value Q is calculated, and in step A61, traction control means 17 outputs instruction value Q as instruction B to engine output control means 18. Thereafter, output rate K1 is calculated from instruction value Q, and real fuel injecting amount F=K1.F0 is calculated in the same manner as described above.

When a predetermined period of time has passed after step A61, n=n+1 is executed in step A62. It is then checked in step A63 if DV>0. Since DV>0 during a time interval between times c and d, the flow advances to step A64. Since $D\dot{V}<0$, the flow returns to step A60. During a time interval between times c and d, this step cycle (A60→A64→A62) is repeated.

If the slip rate is increased again during this step cycle, "YES" is determined in step A64, and Vb=0 is set in step A68. Then, the flow returns to step A42, and traction control is restarted.

When the above-mentioned step cycle is performed and vehicle wheel velocity VW is decreased below Vth1 after time d, DV<0 is established, and the flow advances from step A63 to A65 to calculate instruction value Q. Note that β is a constant determined by experiments. Since instruction value Q is not 0, instruction value Q is output to the engine output control means as instruction B, and real fuel injecting amount F=K1.F0 is then calculated. After a predetermined period of time has passed, since DV<0, "NO" is determined in step A53, and the flow returns to step A65.

The cycle of steps A65, A52, A66, A53, and A65 is repeated. Then, Q is gradually decreased, and then, Q=0 (K1=1) is established. After this state is maintained for a predetermined period of time, since no slip occurs even if engine output rate K1 is set to be 1 to generate a 100% engine output and this state is maintained for a predetermined period of time, "YES" is determined in step A52 to end traction control. Then, in step A67, Q=0 is output to engine output control means 18, and the flow returns to "start" of the flow chart.

Therefore, the same effect as in the third embodiment can be obtained.

In this embodiment, a fuel injecting amount is controlled in accordance with output rates K0 and K1. However, an ignition timing may be controlled to obtain the same effect as described above.

In the first to fourth embodiments, the fuel injecting amount or ignition timing is controlled in accordance with instruction A, and if the fuel injecting amount is controlled by instruction A, it is also controlled by instruction B. If the ignition timing is controlled by instruction A, it is also controlled by instruction B. However, instructions A and B may have different objects to be controlled. Instead of the ignition timing and the fuel injecting amount, a throttle valve opening may be controlled to obtain the same effect as described above.

In a fifth embodiment shown in FIGS. 16 to 19, an object to be controlled of instruction B in the first embodiment is changed to a throttle opening, and since throttle control has poor response to an engine output, K1 corresponding to Sn is output as instruction B from time t3 at which slip amount Sn begins to be calculated, and throttle control according to K1 is started from time t3. Note that the same reference numerals in this embodiment denote the same parts as in the first embodiment, and a detailed description thereof will be omitted. In FIG. 16, traction control means 17 has VW calculating circuit 15, VB calculating circuit 16, Vth1/Vth2 setting means 23, and output rate calculating means 24. Vth1/Vth2 setting means 23 calculates two vehicle velocity signals Vth1 and Vth2. Output rate calculating means 24 executes control of the flow chart shown in FIG. 17 based on VW, Vth1, Vth2, and A/N. The flow chart shown in FIG. 17 includes steps B1, B2, and B3 in addition to the flow chart shown in FIG. 5. Engine output control means 18 is a control means for a sequential multipoint injection engine, and receives signals from inlet air amount detecting means 21 engine speed detecting means 20, vehicle speed sensor 1, and various other sensors 22 (e.g., crank angle sensor, an atmospheric pressure sensor, a water temperature sensor, a knocking sensor, a battery voltage sensor, an intake manifold inner pressure sensor, and the like). Based on these signals, means 18 causes fuel injecting timing detecting means 29 to control an open timing of a fuel injector, causes fuel injecting amount detecting means 28 to control an open time of the fuel injector, and causes ignition timing control means 27 to control an ignition timing. In the above engine, a depression amount X of an acceleration pedal is detected by operating amount detecting means 2, and throttle control means 32 calculates a target torque based on X, VA, N, A/N, and signals from operating amount detecting means 2, vehicle speed sensor 1, engine speed detecting means 20, and load detecting means 25 of engine output control means 18. Means 32 then reads out a throttle opening for obtaining the target torque TOM from a map so as to drive stepping motor 34. Thus, throttle valve 25 (provided in intake path 36) coupled to motor 34 through pulleys is driven by means 32.

More specifically, means 32 determines target acceleration $\alpha X$ using a two-dimensional map (VA-X map) based on vehicle speed signal VA from vehicle speed sensor 1 and output signal X from operating amount detecting means 2. $\alpha B$ detecting means 4 differentiates vehicle speed signal VA to calculate real acceleration $\alpha B$. TEM detecting means 5 reads out current output torque TEM from a two-dimensional map (A/N-N map) from engine speed signal N from engine speed detecting means 20 and an A/N signal from load detecting means 25 (which calculates A/N based on engine speed signal N from the engine speed detecting means and inlet air amount signal A from the inlet air amount detecting means). TOM calculating means 7 calculates target torque TOM using the following equation:

$$TOM = \frac{w \cdot r}{g} \times Z \times (\alpha X - \alpha B) + TEM \quad (12)$$

where w is a weight of a vehicle, r is an effective radius of a wheel, g is an acceleration of gravity, and Z is a correction coefficient in consideration of inertia of an engine, a transmission, wheels, and the like. These parameters are stored in coefficient setting means 6.

TOM calculating means 7 calculates target torque TOM based on signals from $\alpha X$ setting means 3, $\alpha B$ setting means 4, and coefficient setting means 6, and outputs the calculated torque to throttle opening setting means 31 through switching means 10.

Figure 18:
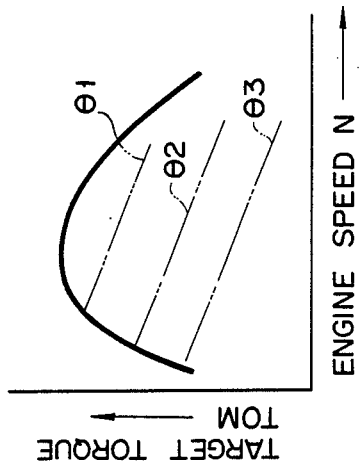
FIG. 18 is a map for calculating throttle opening $\theta$ based on target torque TOM and engine speed N according to the fifth embodiment.

Throttle opening setting means 31 reads out throttle opening 8 in accordance with target torque TOM and the engine speed N using a target torque-engine speed map shown in FIG. 18 which is predetermined by experiments.

Throttle opening setting means 31 sends the signal of throttle opening $\theta$ to drive circuit 33. Drive circuit 33 outputs a step count signal corresponding to the $\theta$ signal to stepping motor 34. Thus, stepping motor 34 opens/-closes throttle valve 35, and moves it to the calculated throttle opening.

A driver stops a vehicle on a slippery road surface, and then depresses an acceleration pedal to start the vehicle. Then, operating amount detecting means 2 detects the depression amount of the pedal, and throttle control means 32 causes stepping motor 34 to rotate accordingly, thereby opening throttle valve 35.

In this case, front vehicle wheels (driving wheels) slip, and vehicle wheel velocity VW is increased. When vehicle wheel velocity VW exceeds Vth1, in output rate calculating means 24, since DV>0 and DV>0 are established, "YES" is determined in step A2 in FIG. 17, and the flow advances to step A4 through step A3.

In step A4, output rate K0 is calculated from the A/N−K0 curve shown in FIG. 7 using the A/N signal from load detecting means 25. In step A5, output rate calculating means 24 outputs output rate K0 as instruction A.

Figure 19:
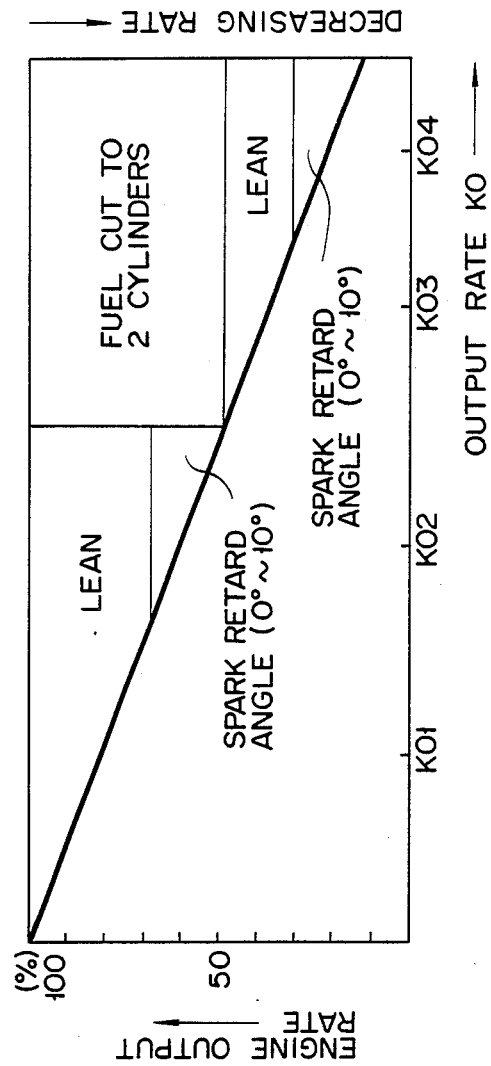
FIG. 19 is a map showing a fuel lean mixture, spark retard angle, and fuel cut to 2 cylinders based on the relationship among output rate K0, a decreasing rate, and an engine output rate according to the fifth embodiment.

When selecting means 26 receives instruction A, it selects output decreasing means according to output rate K0 and reads out a distribution of decrease amounts of a plurality of output decreasing means from the map shown in FIG. 19.

For example, if output rate K0 is K01, the engine output rate is 80% that obtained when no traction control is performed. The decrease in output is achieved by decreasing a fuel amount, i.e., fuel lean. Selecting means 26 sends an instruction to cause fuel injecting amount detecting means 28 to decrease an engine output by 20% by fuel lean. Thus, fuel injecting amount detecting means 28 reads out a correction value of a valve opening time of injectors for decreasing the engine output by 20% from the map, and outputs the corrected valve opening time to fuel injector drive control means 30. Then means 30 drives injectors for the corrected time.

When output rate K0 defined by instruction A is K02, the engine output rate is 60% that obtained when no traction control is performed. Of the output decreasing rate of 40%, the output is decreased by 30% by decreasing a fuel amount (fuel lean), and is decreased by 10% by delaying an ignition timing. Selecting means 26 outputs an instruction to fuel injecting amount detecting means 28 to decrease the engine output by 30% by fuel lean. Means 28 controls fuel injector drive control means 30 accordingly. At the same time, selecting means 26 outputs an instruction to ignition timing control means 27 to decrease the engine output by 10%. Means 27 reads out a spark retard angle for decreasing the engine output by 10% from the map to correct the ignition timing, and outputs the corrected ignition timing to ignition device 19 to perform ignition.

When output rate K0 defined by instruction A is K03, the engine output rate is 40% that obtained when no traction control is performed. Of the output decreasing rate of 60%, the output decreasing rate of 50% is achieved by outputting a 2-cylinder fuel cut instruction to fuel injecting timing detecting means 29, and the output decreasing rate of 10% is achieved by fuel lean. More specifically, selecting means 26 outputs the 2-cylinder fuel cut instruction to fuel injecting timing detecting means 29. Assume that an engine has four cylinders, a fuel to two cylinders thereof is to be cut, and the ignition order of cylinders in the case of the four-cylinder engine is 1cyl→3cyl→4cyl→2cyl. Selecting means 26 supplies an instruction to fuel injector drive control means 30 to inhibit fuel injection to cylinders 3cyl and 2cyl. At the same time, selecting means 26 supplies an instruction to fuel injecting amount detecting means 28 to decrease the engine output by 10% by fuel lean. Means 28 outputs a fuel amount (injector opening time) for decreasing the engine output by 10% to fuel injector drive control means 30.

When output rate K0 defined by instruction A is K04, the engine output rate is 20% that obtained when no traction control is made, and the output decreasing rate of 80% must be achieved. In this case, the output decreasing rate of 50% is achieved by cutting fuel to two cylinders, that of 20% is achieved by fuel lean, and that of 10% is achieved by retarding an ignition timing. Selecting means 26 supplies instructions to ignition timing control means 27, fuel injecting amount detecting means 28, and fuel injecting timing detecting means 29 to achieve the corresponding output decreasing rate. Then, means 27 outputs an instruction signal to ignition device 19, and means 28 and 29 output instruction signals to fuel injector drive control means 30, thereby decreasing the engine output.

K0 output as instruction A in step A5 is sent to memory means 8. Memory means 8 sequentially updates and stores output torque TEM detected by TEM detecting means 5. When memory means 8 receives instruction A, it stores and holds output torque TEM at that time.

Figure 17A:
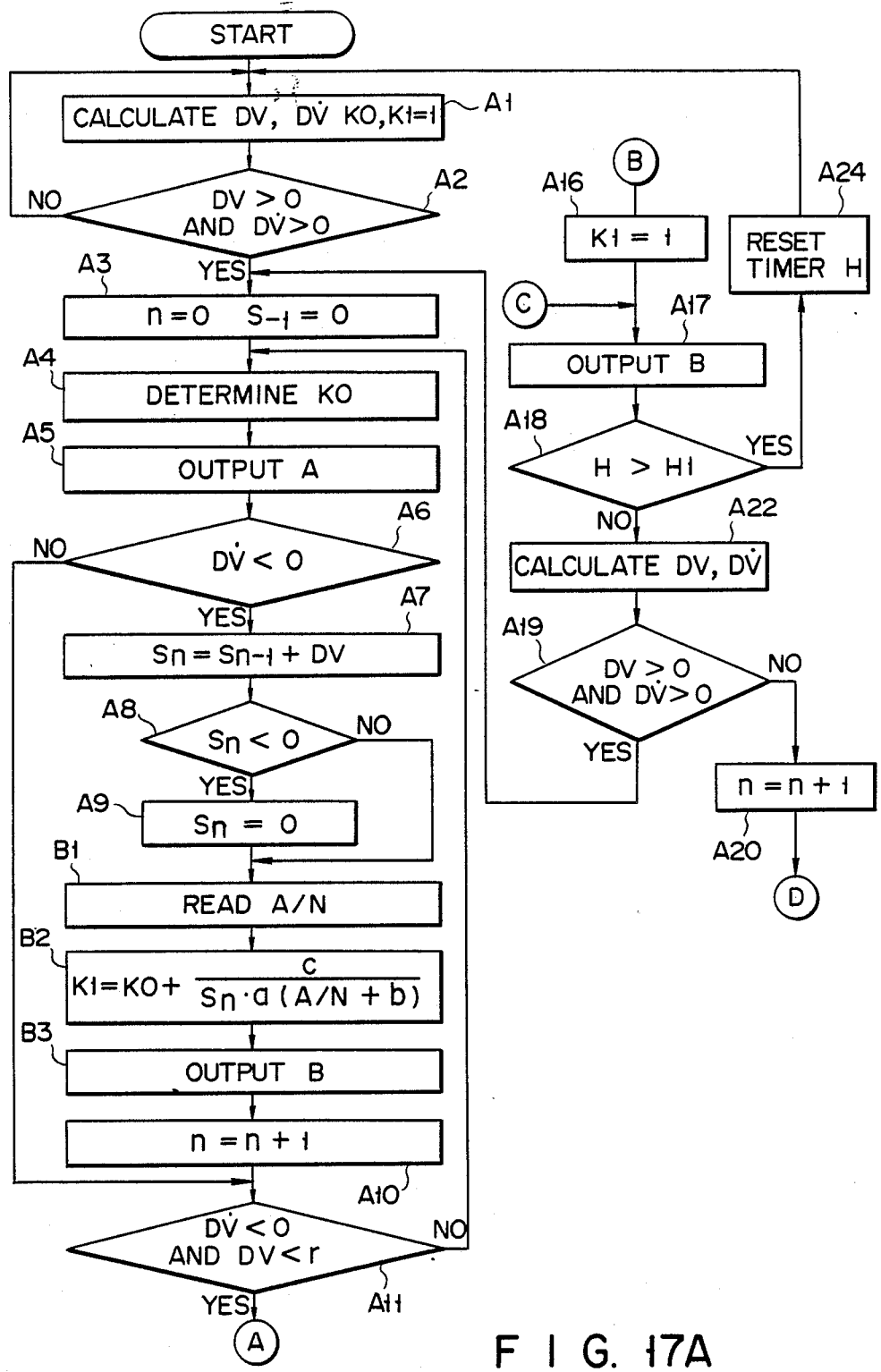
FIGS. 17A and 17B are flow charts of the fifth embodiment.
Figure 17B:
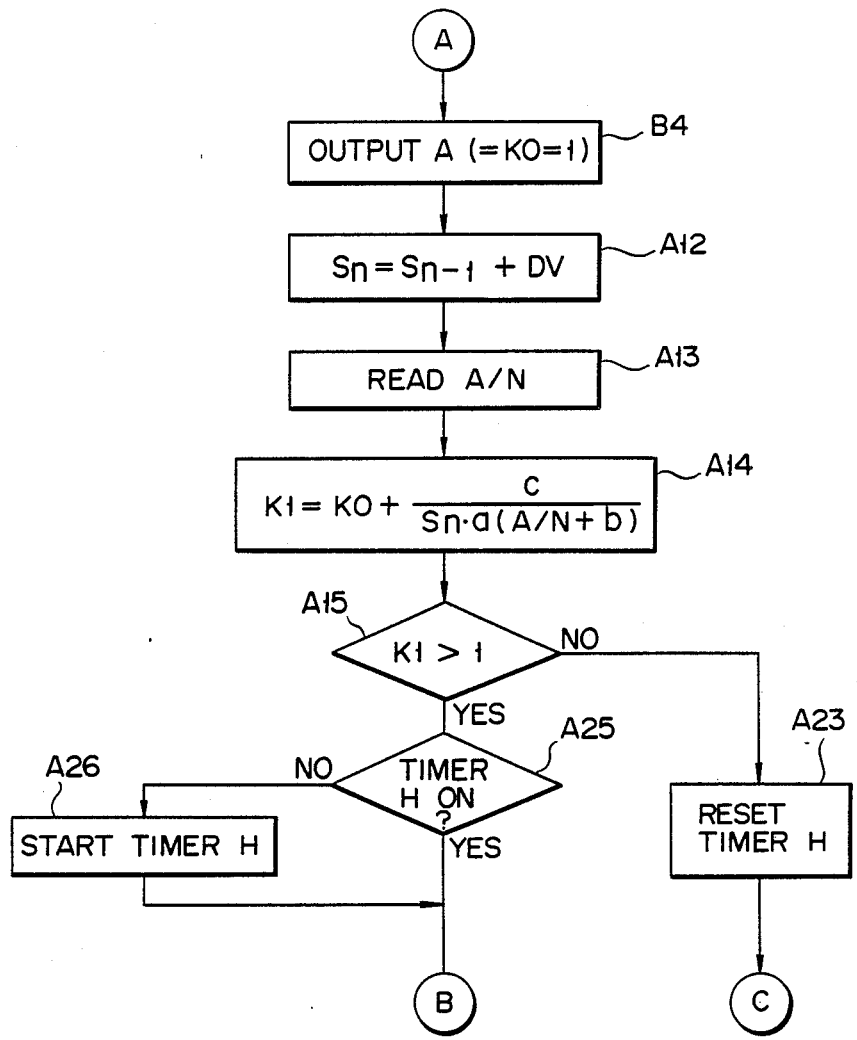

After the instruction is output in step A5 in FIG. 17, it is checked in step A6 if $D\dot{V}<0$. As shown in FIG. 6, if the engine output is decreased at time t2, vehicle wheel velocity VW is not immediately decreased, but is kept increased until time t3. Since $D\dot{V}>0$ until time t3, "NO" is determined in step A6, and the flow advances to step A11. Since $D\dot{V}>0$, "NO" is determined in step A11, and the flow returns to step A4. Until time t3, the cycle of steps A4, A5, A6, A11, and A4 is repeated.

An increase in vehicle wheel velocity VW is suppressed due to a decrease in engine output and friction force of the road surface, and velocity VW begins to decrease at time t3. Then, since $D\dot{V}<0$ is established, "YES" is determined in step A6, and S0=DV is calculated in step A7. The flow then advances from step A8 to step B1. In step B1, A/N data is read from load detecting means 25, and in step B2, K1 is calculated. Subsequently, in step B3, output rate calculating means 24 outputs output rate K1 as instruction B to TOM' calculating means 9 and switching means 10.

TOM' calculating means 9 multiplies output rate K1 with output torque TEM' to calculate slip target torque TOM'=K1.TEM'.

Switching means 10 is switched to supply data from TOM' calculating means 9 to throttle opening setting means 31. Means 31 reads out throttle opening $\theta$ using the above data (output torque TEM'), and causes drive circuit 33 to rotate stepping motor 34, thereby pivoting throttle valve 35 in a closing direction.

When instruction B is output in step B3, n=n+1 is executed in step A10. It is then checked in step A11 if DV<0 and DV<$\gamma$. During a time interval between times t3 and t4, "NO" is determined in step A11, and the flow returns to step A4. The cycle of steps A4, A5, A6, A7, A8, B1, B2, B3, A10, A11, and A4 is repeated.

When the driving wheels are decelerated and vehicle wheel velocity VW is decreased below Vth2, DV<$\gamma$ is established, and "YES" is obtained in step A11. Thus, K0=1 is set by instruction A in step B4, and an instruction not decreasing an output is supplied from selecting means 26 to means 28 and 29. In step B4, K0=0 is established based on instruction A. However, K0 in steps B2 and A14 is held at a value in step A4.

In step A12, Sn is calculated, and A/N data is read in step A13. In step A14, K1 is calculated. Since K1<1 until time t4 to t6 in FIG. 6, "NO" is determined in step A15, and timer H is reset (step A23). In step A17, output rate K1 is calculated, and is output as instruction B. TOM' calculating means 9 calculates slip target torque TOM'=K1.TEM', and throttle opening $\theta$ setting means 31 sets target throttle opening $\theta$ accordingly. Then, drive circuit 33 and stepping motor 34 are driven based on the calculated $\theta$, thereby opening/closing throttle valve 35. The cycle of steps A12, A13, A14, A15, A23, A17, A18, A22, A19, A20, and A12 is repeated until K1>1.

When K1>1 is established after time t6, "YES" is determined in step A15, and timer H is started in step A26. Thereafter, the step cycle of steps A12 to A20 is repeated. When time interval H counted by timer H has passed time interval H1, H>H1 is determined in step A18. More specifically, this judgment means that no slip occurred again when output rate K1=1 (output is not decreased) was maintained for time interval H1. Therefore, if "YES" is obtained in step A18, timer H is reset in step A24, and the flow returns to "start", thus ending traction control.

In addition to the effect of the first embodiment, since engine output control by instruction B is performed based on a throttle opening, a period for which the output is controlled based on fuel and ignition timing is greatly shortened, protection of a catalyst, prevention of a decrease in exhaust gas cleaning capability, prevention of output variation, and prevention of vibration can be achieved.

In this embodiment, when TOM calculated by TOM calculating means 7 is smaller than slip target torque TOM' calculated by TOM' calculating means 9, switching means 10 outputs target torque TOM to throttle opening setting means 31.

In this embodiment, the target torque TOM is calculated based on signal X from operating amount detecting means 2 to set a throttle opening. However, if the throttle opening is directly set by signal X, the same effect as described above may be obtained.

In this embodiment, K0 in step A4 is determined based on A/N data at time t2. However, output rate K0 may be determined from A/N data when step A4 is executed during a time interval between times t2 and t4 for which instruction A is output.

In addition, during a time interval between times t3 and t4, both instructions A and B are output. When an actual engine output is decreased due to output rate K0 determined by instruction A, target engine torque TOM"=K0.TEM' under the control by instruction A, which is obtained based on output torque TEM' at time t2 and output rate K0 determined by instruction A, is compared with current output torque TEM detected by TEM detecting means 5. If TEM<TOM", output rate K0 of instruction A is increased to establish TEM=T0M". In place of increasing output rate K0, pseudo output rate K0X can be calculated by selecting means 26 to increase the engine output, thus obtaining the same effect as described above.

The step of calculating Q=K.Sn ($0 \leq Q < 8$) can be inserted between steps A46 and A47 in the flow chart shown in FIG. 9. Then, the flow chart shown in FIG. 9 of the second embodiment can be used in place of the flow chart shown in FIG. 17 of the fifth embodiment.

In the fifth embodiment, vehicle speed sensor 1 and vehicle body velocity sensors (driven wheel velocity sensors) 13 and 14 are separately arranged. However, vehicle body velocity sensors 13 and 14 need only be arranged. In this case, output VB from VB calculating circuit 16 may be sent as vehicle speed signal VA to $\alpha X$ setting means 3, $\alpha B$ setting means 4, and engine output control means 18.

What is claimed is:

1. A traction control apparatus for a vehicle engine, comprising: driving wheel velocity detecting means for detecting a velocity of a driving wheel of a vehicle; vehicle velocity detecting means for detecting a velocity of the vehicle; traction control means comprising slip detecting means for detecting slipping of the driving wheels, in accordance with an output signal from said driving wheel velocity detecting means and an output signal from said vehicle velocity detecting means, and output rate calculating means for generating a first instruction A employing an engine output rate K0, determined in accordance with an engine load A/N, for controlling an engine output to immediately decrease a slip rate, on the basis of a slip start signal from said detecting means and for, when the slip rate is decreased to a predetermined value, generating a second instruction B for controlling the engine to provide an output according to friction coefficient $\mu$ between a road surface and the wheels; and engine output control means for controlling the engine output, on the basis of the first and second instructions and the vehicle operating conditions.

2. An apparatus according to claim 1, wherein said output rate calculating means generates second instruction B for causing the engine to generate road surface torque Tr which is transmitted from the wheels to the road surface.

3. An apparatus according to claim 1, wherein said output rate calculating means uses, as first instruction A, an engine output rate determined in accordance with engine load A/N and a change rate of the driving wheel velocity, obtained from said driving wheel velocity detecting means.

4. An apparatus according to claim 1, wherein said output rate calculating means uses, as first instruction A, instruction value Q, calculated in accordance with an acceleration of the driving wheels, obtained from said driving wheel velocity detecting means, and said engine output control means calculates engine output rate K1 on the basis of instruction value Q and engine load A/N, to control the engine output in accordance with the engine output rate.

5. An apparatus according to claim 1, wherein said output rate calculating means estimates a friction coefficient between the road surface and the wheels on the basis of the amount of slip.

6. An apparatus according to claim 1, wherein said output rate calculating means estimates friction coefficient $\mu$, between the road surface and the wheels, on the basis of a change in driving wheel velocity.

7. An apparatus according to claim 5, wherein said output rate calculating means outputs, as second instruction B, output rate K1 represented by the following equation:

$$K1 = K0 + \frac{C}{Sn \cdot a(A/N + b)}$$

where K0 is an output rate determined by the first instruction, $Sn = Sn-1 + DV$ (DV is a difference between the driving wheel velocity and a vehicle wheel velocity at which said slip detecting means determines the slip), A/N is an amount of intake air/engine speed, and a, b, and c are constants.

8. An apparatus according to claim 6, wherein said output rate calculating means outputs, as second instruction B, output rate K1 represented by the following equation:

$$K1 = K0 - \frac{I \cdot \dot{\omega}}{a(A/N + b)} + Pn$$

where K0 is an output rate determined by the first instruction, $\dot{\omega}$ is an acceleration when the slipping driving wheels are decelerated, I is a rotational inertial moment of wheels, a, b, and P are constants, and $n = n+1$.

9. An apparatus according to claim 5, wherein said output rate calculating means outputs, as instruction B, instruction value Q represented by the following equation:

$$Q = K \cdot Sn$$

where K is a constant, and $Sn = Sn-1 + DV$, wherein (DV is a difference between the driving wheel velocity and a wheel velocity at which said slip detecting means determines the slip), and said engine output control means calculates output rate K1 on the basis of instruction value Q and engine load A/N, to control the engine output.

10. An apparatus according to claim 6, wherein said output rate calculating means outputs, as instruction B, instruction value Q represented by the following equation:

$$Q = \alpha \cdot \dot{\omega}$$

where $\alpha$ is a constant, and $\omega = (Vb - VW)/n$, (wherein $n = n+1$, VW is a current driving wheel velocity, and Vb is a maximum value of VW), and said engine output control means calculates output rate K1 on the basis of instruction value Q and engine load A/N, to control the engine output.

11. An apparatus according to claim 10, wherein said output rate calculating means first sets instruction value Q to be $Q = \alpha \cdot \dot{\omega}$ so as to decrease the driving wheel velocity to a wheel velocity at which the slip is determined, and thereafter, sets instruction value Q to be $Q = Q - \beta$, wherein ($\beta$ is a constant) until the driving wheel velocity becomes substantially equal to the vehicle velocity.

12. An apparatus according to claim 1, wherein said engine output control means has ignition timing control means, fuel injection amount detecting means, and fuel injecting timing detecting means for respectively calculating an ignition timing, a fuel injection amount, and a fuel injecting timing, said fuel injecting timing detecting means also determining whether or not fuel injection is to be performed, and selecting means for selecting one or a plurality of said ignition timing control means, said fuel injection amount detecting means, and said fuel injecting timing detecting means, in accordance with an engine output rate determined by instruction A from said output rate calculating means, and for determining an output rate of the selected means.

13. An apparatus according to claim 12, wherein said engine output control means controls a throttle valve opening in accordance with instruction B from said output rate calculating means.

14. An apparatus according to claim 13, wherein said output rate calculating means begins to output instruction B during outputting of instruction A.

* * * * *